US012423823B2

United States Patent
Tafazoli Bilandi et al.

(10) Patent No.: US 12,423,823 B2
(45) Date of Patent: Sep. 23, 2025

(54) APPARATUS FOR ANALYZING A PAYLOAD BEING TRANSPORTED IN A LOAD CARRYING CONTAINER OF A VEHICLE

(71) Applicant: MOTION METRIC INTERNATIONAL CORP., Vancouver (CA)

(72) Inventors: Shahram Tafazoli Bilandi, Vancouver (CA); Saman Nouranian, North Vancouver (CA); Glen Richard Floyd Turner, Richmond (CA); Haobing Chu, Richmond (CA); Enoch Chow, Burnaby (CA); Saeed Karimifard, Vancouver (CA); Mohammad Sameti, Coquitlam (CA)

(73) Assignee: MOTION METRICS INTERNATIONAL CORP., Vancouver (CA)

( * ) Notice: Subject to any disclaimer, the term of this patent is extended or adjusted under 35 U.S.C. 154(b) by 432 days.

(21) Appl. No.: 17/787,261

(22) PCT Filed: Dec. 16, 2020

(86) PCT No.: PCT/CA2020/051729
§ 371 (c)(1),
(2) Date: Jun. 17, 2022

(87) PCT Pub. No.: WO2021/119813
PCT Pub. Date: Jun. 24, 2021

(65) Prior Publication Data
US 2023/0020799 A1    Jan. 19, 2023

Related U.S. Application Data

(60) Provisional application No. 62/949,299, filed on Dec. 17, 2019.

(51) Int. Cl.
*G06T 7/11* (2017.01)
*G06N 3/08* (2023.01)
(Continued)

(52) U.S. Cl.
CPC .................. *G06T 7/11* (2017.01); *G06N 3/08* (2013.01); *G06T 7/0004* (2013.01); *G06T 7/174* (2017.01);
(Continued)

(58) Field of Classification Search
CPC .......... G06N 3/045; G06N 3/08; G06N 3/088; G06T 2207/10016; G06T 2207/10021;
(Continued)

(56) References Cited

U.S. PATENT DOCUMENTS 7,020,307 B2    3/2006  Hinton et al.
7,257,467 B2    8/2007  Hagenbuch
(Continued)

FOREIGN PATENT DOCUMENTS

CA          2972183       6/2017
CN       204881521 U     12/2015
(Continued)

OTHER PUBLICATIONS

He, K., Gkioxari, G., Dollár, P., & Girshick, R. (2017). Mask r-cnn. In Proceedings of the IEEE international conference on computer vision (pp. 2961-2969). (Year: 2017).*
(Continued)

*Primary Examiner* — Chineyere Wills-Burns
*Assistant Examiner* — Emmanuel Silva-Avina
(74) *Attorney, Agent, or Firm* — Palmer Dzurella

(57) ABSTRACT

An apparatus for analyzing a payload being transported in a load carrying container of a vehicle is disclosed. The apparatus includes a camera disposed to successively capture images of vehicles traversing a field of view of the camera.
(Continued)

The apparatus also includes at least one processor in communication with the camera, the at least one processor being operably configured to select at least one image from the successively captured images in response to a likelihood of a vehicle and load carrying container being within the field of view in the at least one image, and image data associated with the least one image meeting a suitability criterion for further processing. The further processing includes causing the at least one processor to process the selected image to identify a payload region of interest within the image and to generate a payload analysis within the identified payload region of interest based the image data associated with the least one image.

32 Claims, 12 Drawing Sheets

(51) Int. Cl.
*G06T 7/00* (2017.01)
*G06T 7/174* (2017.01)
*G06T 7/593* (2017.01)
*G06T 7/62* (2017.01)

(52) U.S. Cl.
CPC ............. *G06T 7/593* (2017.01); *G06T 7/62* (2017.01); *G06T 2207/10021* (2013.01); *G06T 2207/10028* (2013.01); *G06T 2207/10048* (2013.01); *G06T 2207/20081* (2013.01); *G06T 2207/20084* (2013.01); *G06T 2207/30252* (2013.01)

(58) Field of Classification Search
CPC . G06T 2207/10028; G06T 2207/10032; G06T 2207/10048; G06T 2207/20076; G06T 2207/20084; G06T 2207/20081; G06T 7/0004; G06T 7/11; G06T 7/174; G06T 7/521; G06T 7/62; G06T 7/593; G08G 1/017; G01B 11/24; G01V 8/02
USPC ......................................................... 382/103
See application file for complete search history.

(56) References Cited

U.S. PATENT DOCUMENTS

| | | | |
|---|---|---|---|
| 8,284,096 B2 | 10/2012 | Martinez Godoy et al. | |
| 8,379,927 B2 | 2/2013 | Taylor | |
| 9,025,731 B2 | 5/2015 | Kotowski et al. | |
| 10,290,115 B2 | 5/2019 | Baumgartner | |
| 10,783,610 B2 | 9/2020 | Tafazoli Bilandi et al. | |
| 2003/0156739 A1* | 8/2003 | Hinton | G06T 7/62 382/109 |
| 2011/0074619 A1 | 3/2011 | Martinez Godoy et al. | |
| 2012/0114181 A1 | 5/2012 | Borthwick et al. | |
| 2014/0363048 A1* | 12/2014 | Vrcelj | G06F 18/211 382/103 |
| 2017/0103580 A1 | 4/2017 | Petrany et al. | |
| 2017/0228885 A1* | 8/2017 | Baumgartner | H04N 13/204 |
| 2018/0179732 A1 | 6/2018 | Bartsch et al. | |
| 2018/0239849 A1 | 8/2018 | Martinsson et al. | |
| 2021/0042928 A1* | 2/2021 | Takeda | G06N 3/084 |
| 2021/0262204 A1* | 8/2021 | Tafazoli Bilandi | G06N 3/082 |

FOREIGN PATENT DOCUMENTS

| | | | | |
|---|---|---|---|---|
| CN | 208000384 U | 10/2018 | | |
| CN | 109029254 A | 12/2018 | | |
| EP | 1734471 A2 | 12/2006 | | |
| EP | 1803107 B1 | 11/2010 | | |
| EP | 2439487 B1 | 8/2012 | | |
| EP | 3347672 B1 | 4/2020 | | |
| ES | 2301327 | 6/2008 | | |
| JP | 3867955 B2 | 1/2007 | | |
| KR | 10-2017-0026805 A | 3/2017 | | |
| KR | 1815583 B1 | 1/2018 | | |
| WO | WO2004106897 A1 | 12/2004 | | |
| WO | WO2015135015 A1 | 9/2015 | | |
| WO | WO2018148832 A1 | 8/2018 | | |
| WO | WO-2019098901 A1 * | 5/2019 | | G01B 11/02 |
| WO | WO2019227194 A1 | 12/2019 | | |
| WO | WO2020049517 A1 | 3/2020 | | |

OTHER PUBLICATIONS

Kaiming He et al, Deep Residual Learning for Image Recognition, Microsoft Research, arXiv:1512.03385v1 [cs.CV] Dec. 10, 2015.
Kaiming He et al., Mask R-CNN, Facebook AI Research (FAIR), arXiv:1703.06870v3 [cs.CV] Jan. 24, 2018.

* cited by examiner

APPARATUS FOR ANALYZING A PAYLOAD BEING TRANSPORTED IN A LOAD CARRYING CONTAINER OF A VEHICLE

1. FIELD

This disclosure relates generally to processing of captured images and more particularly to capturing and processing images of a vehicle to analyze a payload being carried in a load carrying container of the vehicle.

2. DESCRIPTION OF RELATED ART

Large vehicles are commonly used to transport a payload in an open bed of the vehicle. As an example, in mining operations mining shovels and excavators load an ore payload onto a haul truck for transportation to a processing location. The nature and volume of the ore payload is often of importance, since downstream processing may rely on the payload not including large boulders or other undesired materials such as a detached tooth, which could potentially cause equipment damage during later processing of the payload. Another important aspect may be a degree of fragmentation or particle size distribution of the ore in the payload. In mining operations, due to the large size and capital cost of equipment involved in loading mined ore, monitoring of payload may ensure safe and/or efficient operation of the involved equipment. There remains a need to methods and systems for boulder detection and evaluating particle size distribution.

SUMMARY

In accordance with one disclosed aspect there is provided an apparatus for analyzing a payload being transported in a load carrying container of a vehicle. The apparatus includes a camera disposed to successively capture images of vehicles traversing a field of view of the camera. The apparatus also includes at least one processor in communication with the camera, the at least one processor being operably configured to select at least one image from the successively captured images in response to a likelihood of a vehicle and load carrying container being within the field of view in the at least one image, and image data associated with the least one image meeting a suitability criterion for further processing. The further processing includes causing the at least one processor to process the selected image to identify a payload region of interest within the image, and generate a payload analysis within the identified payload region of interest based the image data associated with the least one image.

The at least one processor may be operably configured to select the at least one image by generating 3D point cloud data for successive captured images, determining a point density of the point cloud data, and comparing the point density to a threshold point density to determine whether the a suitability criterion is met.

The at least one processor may be operably configured to pre-process the 3D point cloud data for the selected image prior to generating the payload analysis, the pre-processing may include at least one of removing point cloud coordinates that are located below an expected height of load supporting base of the load carrying container with respect to a surrounding ground surface, and removing point cloud coordinates that are outside a point cloud sub region within the point cloud, the point cloud sub region being smaller than the point cloud.

When a plurality of images are determined to meet the suitability criterion, the at least one processor may be further operably configured to select for further processing, one of an image having a highest point density, a first image having a point density that exceeds a threshold point density, and a plurality of images that have a point density that exceed the threshold point density.

The processor may be further operably configured to generate a confidence level while processing the selected image to identify a payload region of interest, the confidence level quantifying a confidence that the identified region of interest includes a payload and the confidence level may be used at least in part to determine whether the suitability criterion is met for the selected image.

The at least one processor may be operably configured to select a plurality of images from the successively captured images, each of the plurality of images providing a different view of the a payload and the at least one processor may be operably configured to perform the further processing for each of the plurality of images to produce the payload analysis.

The camera may be disposed above the vehicle and the field of view is oriented downward to capture images of an upper surface of the payload exposed by an open top of the load carrying container.

The at least one processor may include an embedded processor in communication with the camera, the embedded processor being operable to cause image data for the selected image to be transmitted to a remote processor where the further processing is performed by the remote processor.

The embedded processor may include a wide area network interface, the embedded processor being operable to upload the selected image to the remote processor via the wide area network.

The at least one processor, in response to the payload analysis meeting an alert criterion, may be operably configured to cause an alert signal to be produced.

The apparatus may further include an alert annunciator operably configured to generate one of an audible or a visual annunciation for alerting an operator.

The at least one processor may be operably configured to process first and second 2D images from different perspective viewpoints to generate a 3D point cloud including 3D coordinates of the vehicle and the load carrying container.

The camera may include one of first and second image sensors that are offset to capture the respective first and second 2D images from different perspective viewpoints, and a single image sensor operably configured to capture a first and second images spaced apart in time such that movement of the vehicle while traversing the field of view provides the different perspective viewpoints for the first and second images.

The at least one processor may be operable to process one of the respective 2D images to identify the payload region of interest in 2D, and to generate the payload analysis by processing 2D data within with the payload region of interest, and wherein the at least one processor is operably configured to use the 3D point cloud to generate scaling information for the payload analysis.

The at least one processor may be operably configured to process the selected image to identify the payload region of interest using a trained neural network to produce an output localizing the region of interest within the selected image.

The apparatus may include training the neural network using at least one of, a set of images of representative load carrying containers that have been previously labeled by a human, and an unsupervised learning algorithm implemented to extract patterns in the image data.

The neural network may include a mask region based convolutional neural network.

The at least one processor may be operably configured to process the selected image by at least one of processing the image data to intensify shadowed regions prior to performing the payload analysis, performing a rectification of the selected image to correct image distortions caused by imaging optics associated with the camera prior to identifying the payload region of interest, and down-sampling the original selected image to produce a down-sampled image having a reduced number of pixels prior to identifying the payload region of interest.

The output of the neural network may identify boundary pixels demarcating the payload region of interest within the down-sampled image and generating the payload analysis may include determining corresponding boundary pixels within the original selected image and processing portions of original selected image within the corresponding boundary pixels.

The at least one processor may be operably configured to determine an extent of the load carrying container of the vehicle by one of: determining a vehicle identification associated with the selected image and reading parameters from a database defining an extent of the load carrying container for the identified vehicle, and performing the further processing for the vehicle with an empty load carrying container and determining an extent of the load carrying container based on the empty load carrying container.

The at least one processor may be operably configured to perform the vehicle identification by one of: processing at least one of the successive images to extract a vehicle identifier displayed on the vehicle within the field of view of the camera, receiving an identifier from a radio-frequency identification (RFID) sensor disposed to read a RFID tag carried by the vehicle, and processing at least one of the successive captured images using a neural network that has been previously trained to generate a vehicle identification from the captured image.

The processor may be operably configured to generate the payload analysis by determining a volume of the payload by determining a payload fill height within the load carrying container based on 3D coordinates for points within the payload region of interest and calculating the payload volume based on the payload fill height and the determined extents of the load carrying container.

The processor may be operably configured to generate the payload analysis by identifying a foreign object within the payload.

The processor may be operably configured to identify the foreign object by processing infra-red images of the payload, the foreign object being identified by detecting electromagnetic radiation at infra-red wavelengths.

The processor may be operably configured to generate the payload analysis by calculating a load offset, the processor being further operably configured to generate an uneven loading alert if the load offset exceeds a pre-determined maximum load offset.

The processor may be operably configured to generate the payload analysis by performing a segmentation analysis on the payload region of interest to determine sizes of distinguishable portions of the payload.

In response to at least one distinguishable portion exceeding a threshold size or being identified as a non-payload object, the processor may be operably configured to cause an alert signal to be produced.

The payload may include an excavated ore payload and the segmentation analysis may include one of: a fragmentation analysis that identifies distinguishable portions as being one of a rock portion, a fines portion, or an interstice between portions, a load distribution within the extents of the load carrying container, and a moisture analysis that classifies a level of moisture associated with the payload.

The vehicle may be one of a haul truck, a railcar, a barge, a trolley, a LHD vehicle, or a mining skip.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
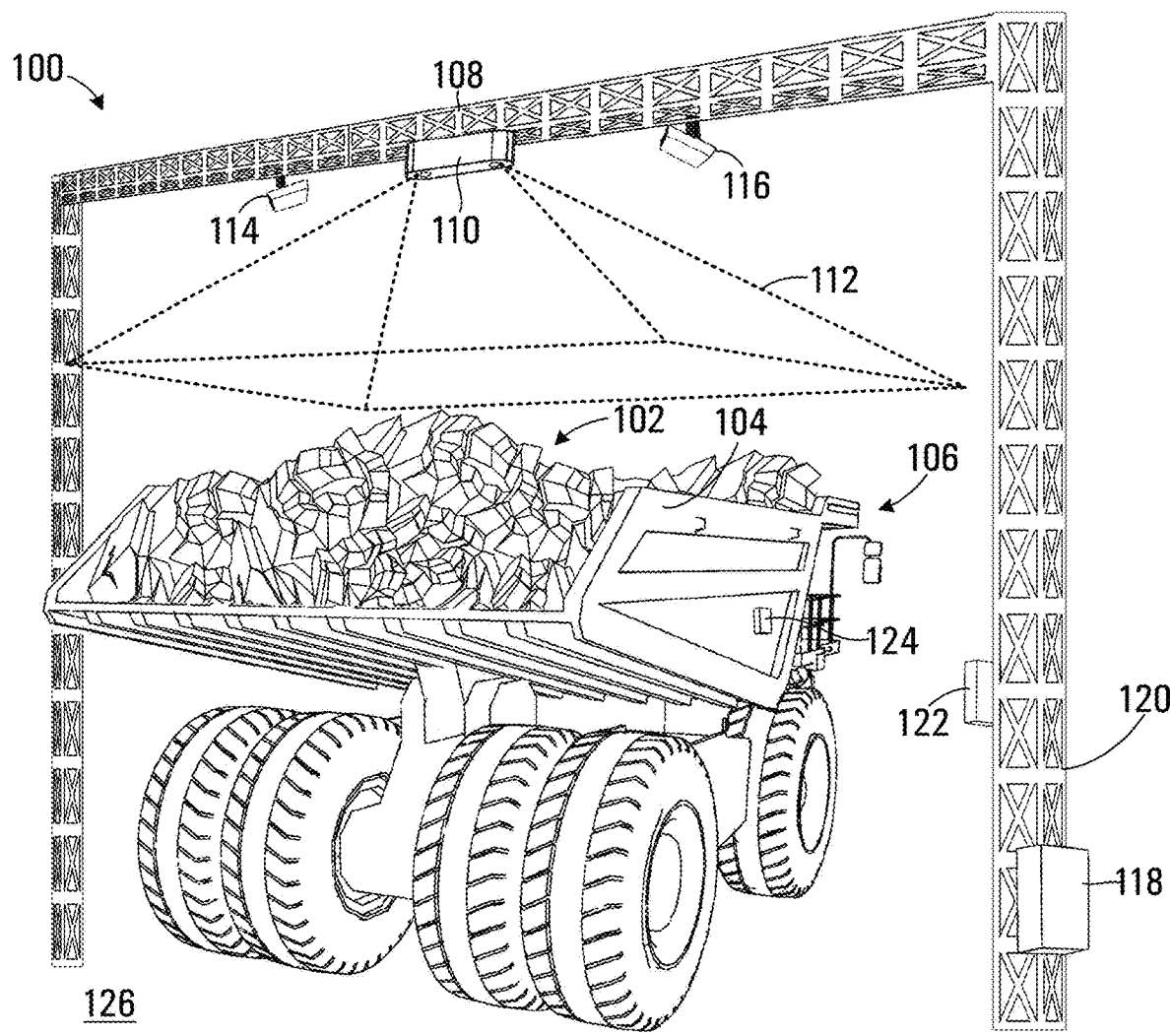
FIG. 1A is a perspective view of an apparatus for analyzing a payload according to a first disclosed embodiment.

Referring to FIG. 1A, an apparatus for analyzing a payload according to a first disclosed embodiment is shown generally at 100. A payload 102 is being transported in a load carrying container 104 of a vehicle 106 passing underneath a truss 108 located at a worksite 126, such as a mine or quarry. In this embodiment the depicted vehicle 106 is a mine haul truck and the payload 102 comprises excavated ore from a worksite 126, such as a mine or quarry. In other embodiments, the load carrying container may be associated with another type of vehicle such as a railcar, a barge, or other seaborne transport container. Alternatively, the load carrying container 104 may be a trolley or skip, such as used in a quarry or underground mining operations. The apparatus 100 includes a camera 110 mounted on the truss 108 and disposed to successively capture images of vehicles traversing a field of view 112 of the camera. In this embodiment the camera 110 is mounted above the vehicle and the field of view 112 is oriented downward to capture images of an upper surface of the payload 102 exposed by an open top of the load carrying container 104. In the embodiment shown the apparatus 100 includes illuminators 114 and 116 directed downwardly to illuminate the field of view 112. The illuminators 114 and 116 may be implemented using ruggedized light emitting diode based light sources.

In this embodiment, the apparatus 100 further includes a junction box 118 mounted at a truss upright member 120. Power, signal, and control cables associated with the camera 110 (not shown in FIG. 1A) are routed back to the junction box 118. The junction box 118 also provides power to the illuminators 114 and 116. In the embodiment shown, the apparatus 100 further includes a radio-frequency identification (RFID) reader 122 for reading a RFID tag 124 affixed to the vehicle 106. A code associated with the RFID tag 124 on the vehicle 106 may be read by the RFID reader 122 to establish an identification of the vehicle 106. The RFID tag 124 may be encoded with an identifier that is uniquely associated with a specific vehicle operating at the worksite 126. In some embodiments the vehicle 106 may be an automated driverless vehicle. For example, self-navigating vehicles may be used in some sites and the vehicle 106 would thus automatically navigate through the truss 108.

Figure 1B:
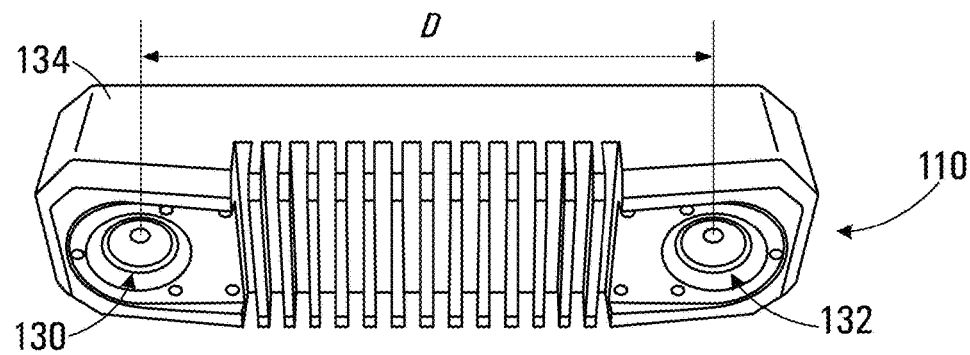
FIG. 1B is a perspective view of a camera used in the apparatus of FIG. 1A.

The camera 110 is shown in isolation in FIG. 1B, and in this embodiment includes a first image sensor 130 and a second image sensor 132 that are mounted within a ruggedized housing 134 offset by a distance D to capture respective first and second 2D images from different perspective viewpoints. The image sensors 130 and 132 may be implemented using full HD color sensors. The use of two spaced apart image sensors 130 and 132 facilitates generation of 3D information by implementing stereoscopic image processing techniques.

The illuminators 114 and 116 would generally be operated at least at nighttime or in low light conditions to facilitate generation of suitable images. In some embodiments the camera may be sensitive to visible light wavelengths, while in other embodiments the camera may be configured to be sensitive to thermal wavelengths or other hyper-spectral wavelengths outside of the visible spectrum. As an example, some objects such as metal objects within the payload 102, by interact differently with thermal wavelengths and aid in identifying such objects.

Figure 1C:
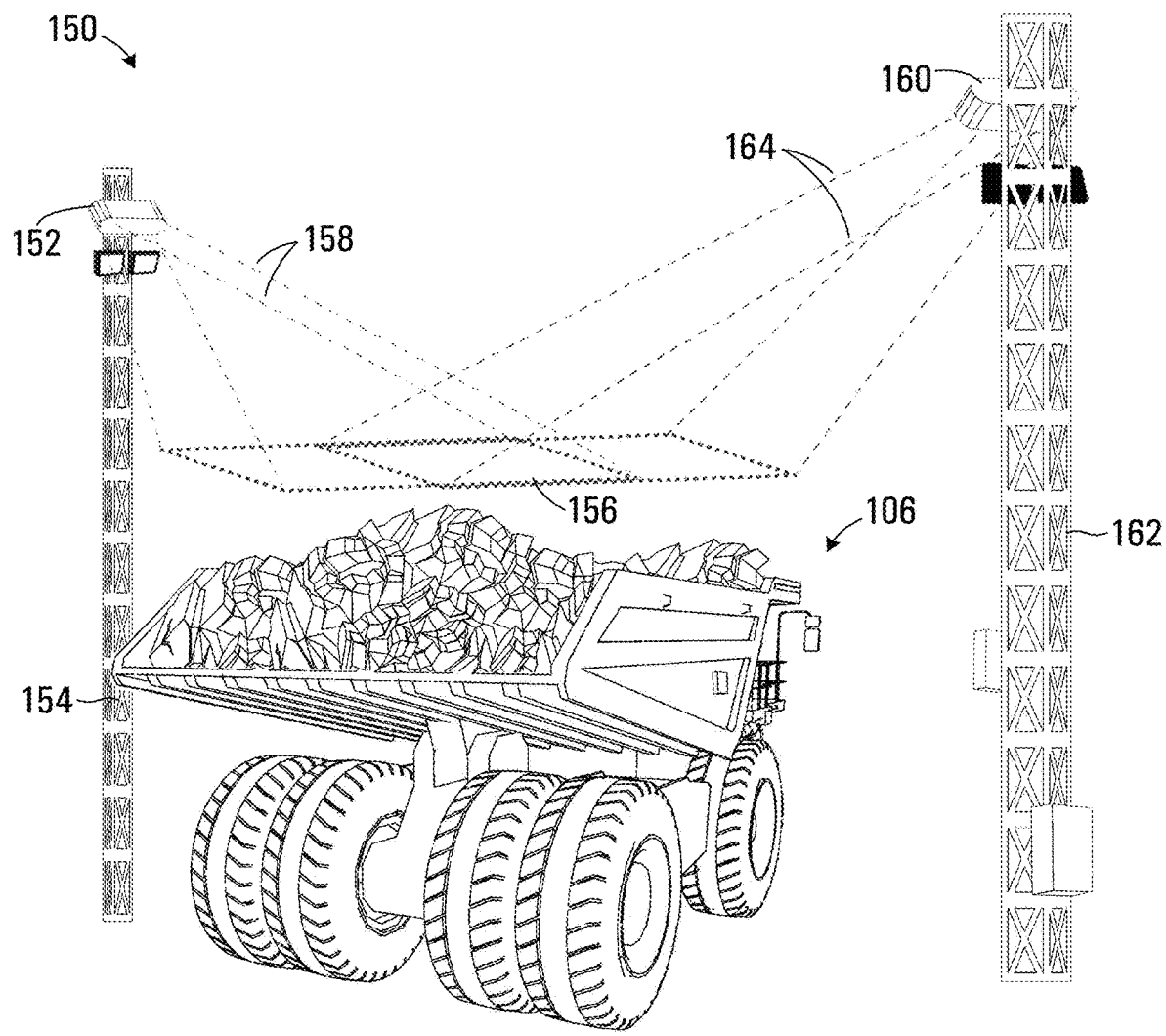
FIG. 1C is a perspective view of an apparatus for analyzing a payload according to another disclosed embodiment.
Figure 1D:
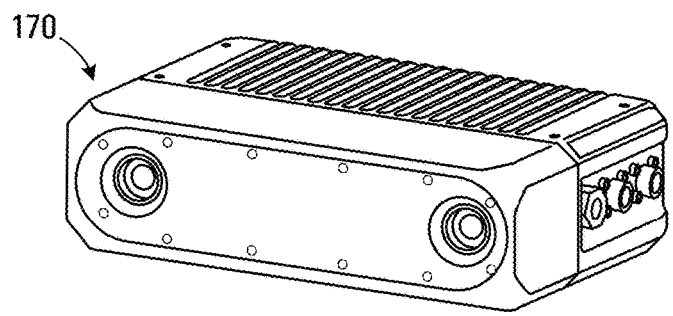
FIG. 1D is a perspective view of another embodiment of a camera that may be used in the apparatus of FIG. 1A or 1C.

Although the camera 110 in FIG. 1A is shown oriented downwardly, in other embodiments the camera may be otherwise oriented. For example, as shown in FIG. 1C, a first camera 152 is mounted on a column truss 154 to the left of the vehicle 106 for capturing images of a field of view 156 from a first perspective 158. A second camera 160 is mounted on a column truss 162 to the right of the vehicle 106 for capturing images of the field of view 156 from a second perspective 164. Referring to FIG. 1D, another example of a camera is shown generally at 170. The camera 170 may be implemented in place of the camera 110 shown in FIG. 1A or the cameras 152 and 160 shown in FIG. 1C.

Figure 1E:
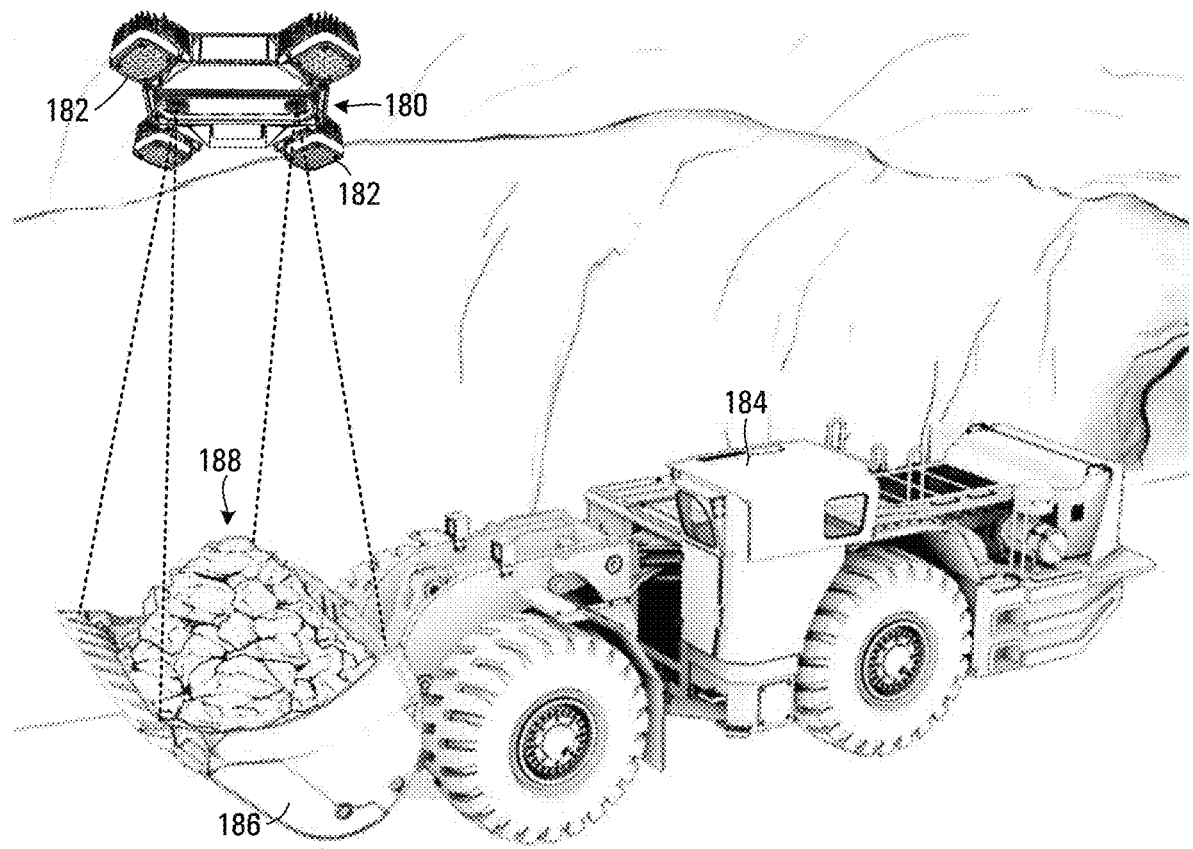
FIG. 1E is a perspective view of an underground worksite in accordance with another disclosed embodiment.

In some embodiments, camera supports other than the truss 108 may be used. For example, in underground mining embodiments the vehicle used may be smaller than the vehicle 106 shown in FIG. 1A and the truss 108 may be scaled accordingly or omitted entirely. Referring to FIG. 1E, an example of an underground mining worksite is shown including a camera 180 mounted to a roof portion of the worksite. The camera 180 in this embodiment is configured as a unit with integrated LED illuminators 182 disposed about the camera. A LHD (load, haul, dump) vehicle 184 is configured for operation in the underground worksite, and includes a relatively large bucket 186 that is operable to both load and transport a payload 188 within the worksite.

Figure 1F:
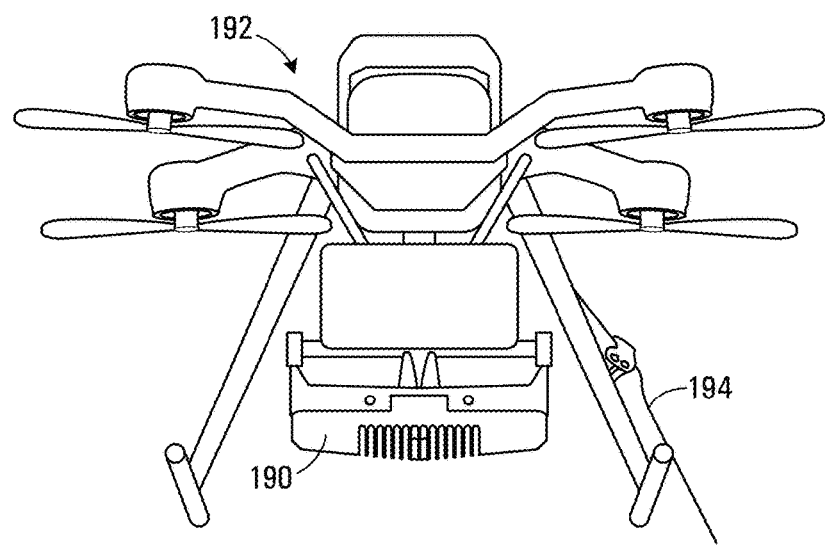
FIG. 1F is a perspective view of a drone embodiment for mounting and disposing the camera of FIG. 1 A.

Referring to FIG. 1F, in another embodiment a camera 190 may be mounted to a drone 192 and the drone may be navigated to above the vehicle to dispose the camera for capturing images. Alternatively, the drone 192 may be tethered by a cable 194, which would constrain the drone to hover in a specific location and dispose the camera 190 for capturing images of a vehicle passing below.

Figure 2:
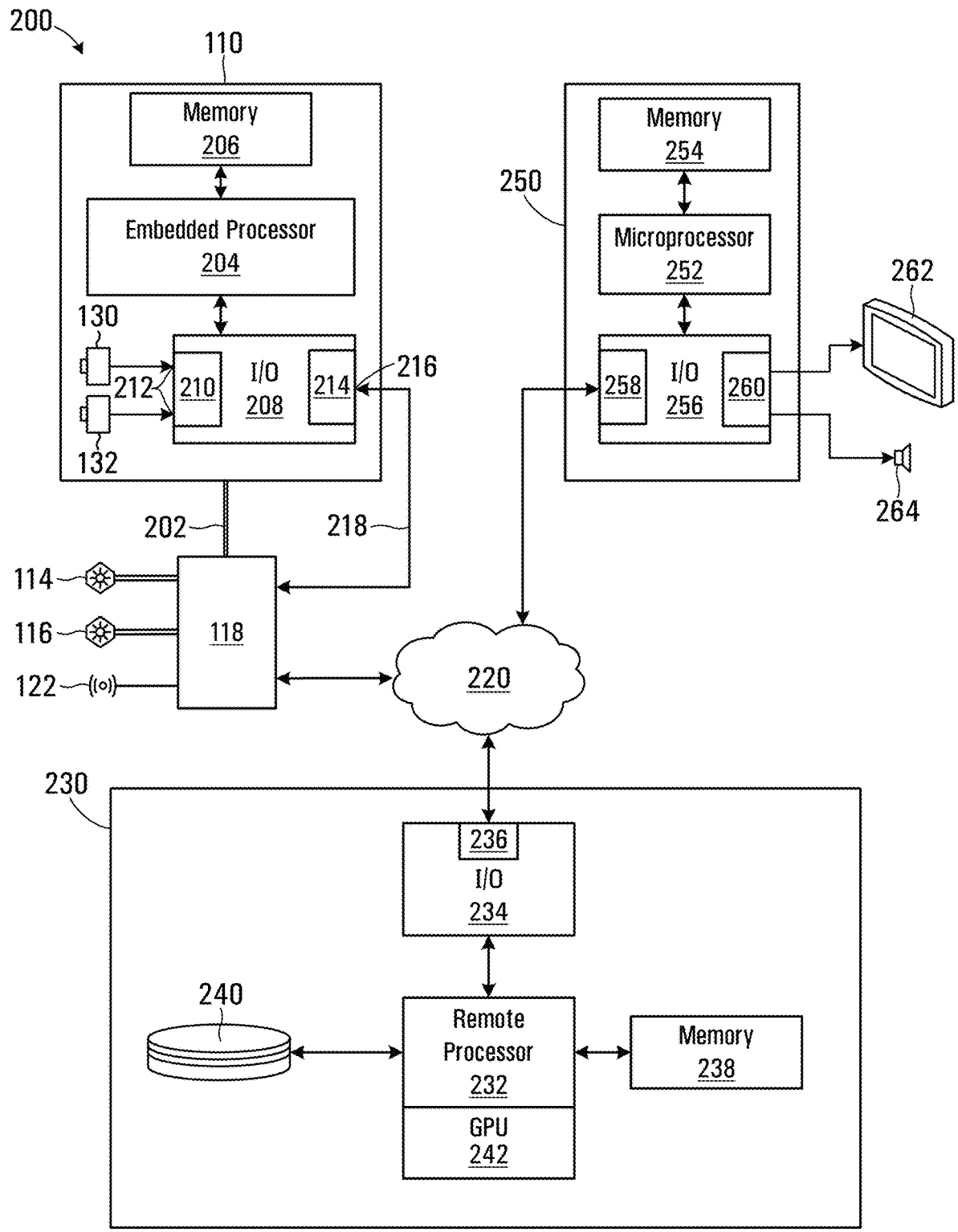
FIG. 2 is a block diagram of a system for analyzing a payload including elements of the apparatus shown in FIG. 1.

A block diagram of a system for analyzing the payload 102 is shown in FIG. 2 at 200. The system 200 includes elements of the apparatus 100, including the camera 110, junction box 118, illuminators 114 and 116, and RFID reader 122. The junction box 118 distributes operating power to the camera 110 via a power conductor 202, and also provides power and control for the illuminators 114 and 116, and the RFID reader 122. In this embodiment the camera 110 includes an embedded processor 204 in communication with a memory 206, and an input/output (I/O) 208, all mounted within the housing 134 (shown in FIG. 1B). The memory 206 provides storage for instructions for directing the embedded processor 204 to capture the successive images and also provides storage for the captured image data.

The I/O 208 is in communication with the embedded processor 204 and implements an image sensor interface 210 that includes inputs 212 for receiving image data from the first and second image sensors 130 and 132. The I/O 208 further includes a communications interface 214, such as an Ethernet interface. The communications interface 214 has port 216, which is connected via a data cable 218 routed back to the junction box 118. The junction box 118 may include a modem, router, or other network equipment that facilitates a data connection to a network 220. The network 220 may be a local area network (LAN) implemented for local data communications within the worksite 126. Alternatively, the junction box 118 may route signals on the data cable 218 to a wide area network, such as the internet. In some embodiments where there is no wired connection available connection to the network 220 the junction box 118 may include a cellular transceiver and the connection to the network 220 may be via a cellular data network or other wireless network connection.

In the embodiment shown in FIG. 2, the system 200 also includes a remote processor circuit 230, which includes a microprocessor 232 in communication with an input/output (I/O) 234. The I/O 234 implements a communications interface 236 for transmitting and receiving data over the network 220. The microprocessor 232 is in communication with a memory 238 for storing data and instruction codes. In this embodiment the microprocessor 232 is also in communication with a mass storage unit 240 for storing image data and for archiving payload analysis results. In the embodiment shown the remote processor circuit 230 further provides processing via a graphics processing unit (GPU) 242, which may be used to provide improved processing power for image processing intensive tasks. The microprocessor 232 may thus be configured as a GPU or the remote processor circuit 230 may further include a GPU co-processor for offloading some processing tasks from the microprocessor.

In embodiments where the network 220 is a local area network, the remote processor circuit 230 may be disposed at an operations center associated with the worksite 126. In other embodiments where the network 220 is a wide area network the remote processor circuit 230 may be located at a remote processing center set up to process images for multiple worksites. Alternatively, the remote processor circuit 230 may be provided as on-demand cloud computing platform, made available by vendors such as Amazon Web Services (AWS).

The system 200 further includes a processor circuit 250, including a microprocessor 252, memory 254, and an I/O 256. The I/O 256 implements a communications interface 258, which is able to receive data via the network 220. The I/O 256 also includes an interface 260 for causing a visual alert on a display 262, or an audible alert on an annunciator 264 such as a loudspeaker or other audible warning device. The processor circuit 250 may be located at the operations center of the worksite 126, where results of payload analysis can be displayed along with any warnings or alerts. Alternatively, the processor circuit 250 may be located in a cab of the vehicle 106 and wirelessly connected to the network 220. In self-navigating or other driverless vehicles such as a railway load carrying container 104, the alert signal may be otherwise processed to cause the vehicle to be diverted or flagged so that further action can be taken.

While the embodiment of the system 200 shown in FIG. 2 includes an embedded processor 204 within the camera 110 and a separate remote processor circuit 230, in other embodiments the system may combine the embedded and remote processors. Functions described below as being performed by the remote processor circuit 230 may thus be performed by the embedded processor 204 or any other combination of processor circuits.

Figure 3:
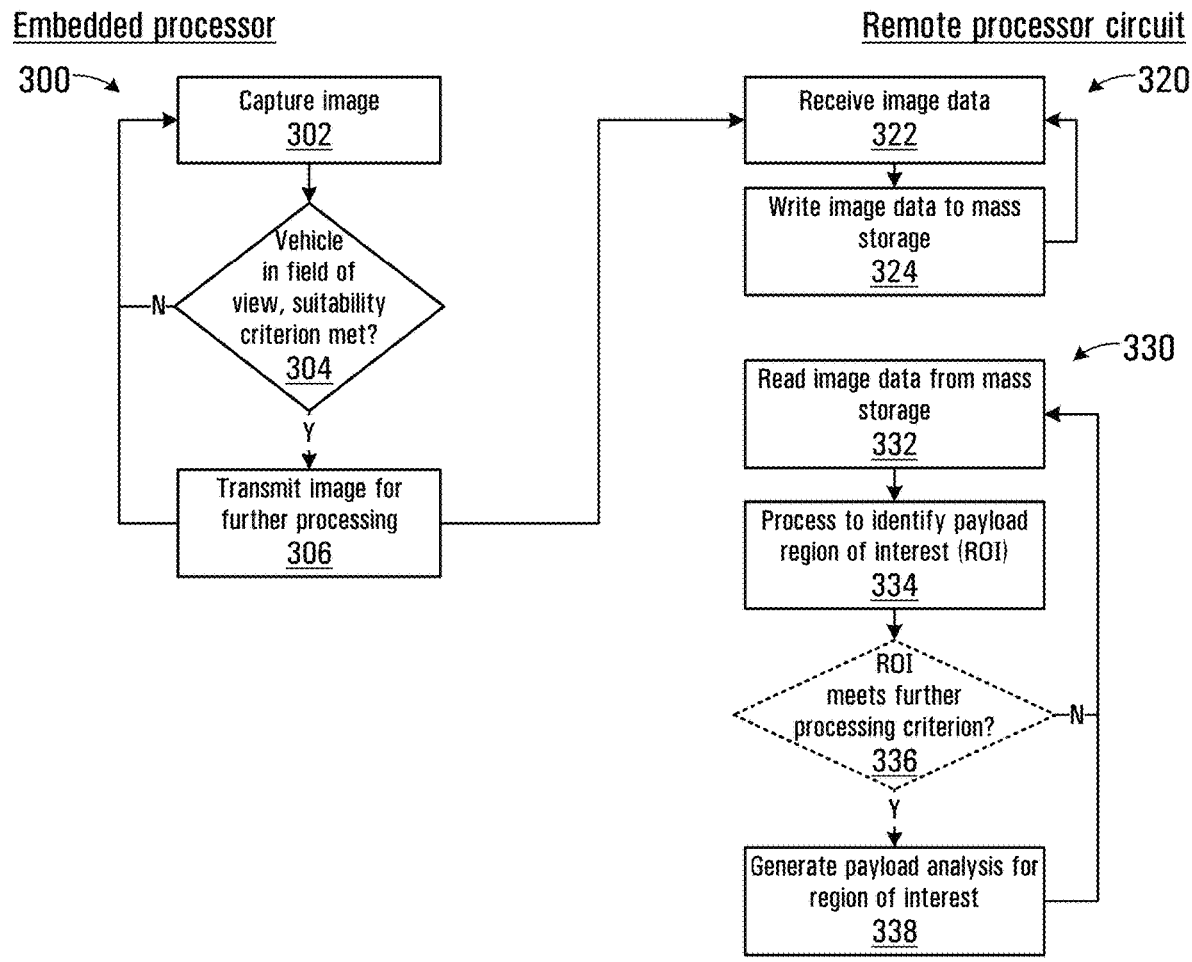
FIG. 3 is a flowchart depicting blocks of code for directing an embedded processor of the system shown in FIG. 2 to provide image capture functions.

Referring to FIG. 3, a flowchart depicting blocks of code for directing the embedded processor 204 to provide image capture functions is shown generally at 300. The blocks generally represent codes that may be read from the computer readable medium memory 206 for directing the embedded processor 204 to various functions. The actual code to implement each block may be written in any suitable program language, such as C, C++, C#, Java, and/or assembly code, for example.

The image capture process 300 begin at block 302, which directs the embedded processor 204 to cause the camera 110 to successively capture images within the field of view 112 of the camera. Block 302 thus may direct one or both of the image sensors 130 and 132 to capture successive images, which may be received via the image sensor interface 210 and stored in the memory 206. An example of a captured image is shown at 400 in FIG. 4, where the image is bounded by the field of view 112 represented as a broken outline. In practice images captured by the image sensor 130 will differ slightly in perspective from the images captured by the image sensor 132. The image example 400 thus represents one of the images captured by either the image sensor 130 or the image sensor 132.

Block 304 then directs the embedded processor 204 to determine whether there is a likelihood of a vehicle and load carrying container being within the field of view. The embedded processor 204 is also directed to determine whether the captured image data meets a suitability criterion for further processing. The camera 110 may thus continuously capture images of the field of view 112, which may or may not have a vehicle 106 within the field of view. If there is a likelihood that a vehicle is within the field of view 112, the embedded processor 204 makes a further determination as to whether the image data is suitable for further processing. As an example, the vehicle 106 may only be partially located within the field of view 112 in some images and more suitable images that include a clear view of the vehicle 106, payload 102, and ground surfaces 402 surrounding the vehicle may be obtained or may already have been obtained.

If at block 304, the image meets the suitability criterion, the embedded processor 204 is directed to block 306. Block 306 directs the embedded processor 204 to cause the selected image data to be read from the memory 206 and transmitted via the communications interface 214 and the network 220 to the remote processor circuit 230. The selected image data may be tagged or otherwise associated with the vehicle identification generated by the RFID reader 122 by reading the RFID tag 124 on the vehicle 106. For example, the selected image may have the vehicle identifier embedded in an image metadata field and transmitted together with the image data.

While in this embodiment the vehicle identifier is read from the RFID tag 124, in other embodiments the vehicle identifier may be otherwise generated. For example, a vehicle identifier may be displayed on the vehicle within the field of view 112 of the camera 110 and determined by processing the one of the captured images to extract the identifier from the image. Alternatively, one of the captured images may be processed using a neural network that has been previously trained to generate a vehicle identification output for the captured image. The neural network may be trained using a set of labeled images of vehicles in use at the worksite 126 to permit the neural network to identify any of the vehicles in use.

Still referring to FIG. 3, a flowchart depicting blocks of code for directing the microprocessor 232 of the remote processor circuit 230 to receive image data is shown generally at 320. Block 322 directs the microprocessor 232 to receive the image data from the camera 110. In some embodiments images from both of the image sensors 130 and 132 may be transmitted by the apparatus 100 and received at the remote processor circuit 230. Block 324 further directs the microprocessor 232 to write the image data to the mass storage unit 240. In some embodiments image data may be received at a rate that is too high to permit further processing in real time. Storing the image data in the mass storage unit 240 facilitates queueing of image data awaiting further processing. In most cases immediate payload analysis results may not be essential and may be delayed by a minute or more and still provide an effective and timely notification to the operations center at the worksite 126.

Still referring to FIG. 3, a flowchart depicting blocks of code for directing the microprocessor 232 of the remote processor circuit 230 to perform further processing is shown generally at 330. The further processing process 330 begins at block 332, which directs the microprocessor 232 to read image data for the next image to be further processed from the mass storage unit 240 into the memory 238. Block 334 then directs the microprocessor 232 to process the image data to identify a payload region of interest within the image. Referring again to FIG. 4, the payload region of interest has been designated at 404 using a broken line surrounding the ore in the load carrying container 104.

The process 320 then continues at block 336. Optionally, when identifying the payload region of interest 404, the microprocessor 232 may be directed to generate a confidence level quantifying a confidence that the identified region of interest includes a payload. In this case, block 336 directs the microprocessor 232 to further determine whether a further processing criterion is met for the selected image based on the level of confidence associated with the identified payload region of interest 404. If at block 336, the further processing criterion is not met by the payload region of interest 404, the microprocessor 232 is directed back to block 332 to process the next image. If at block 326, the further processing criterion is met, the microprocessor 232 is directed to block 338 to process the next queued image.

Figure 4:
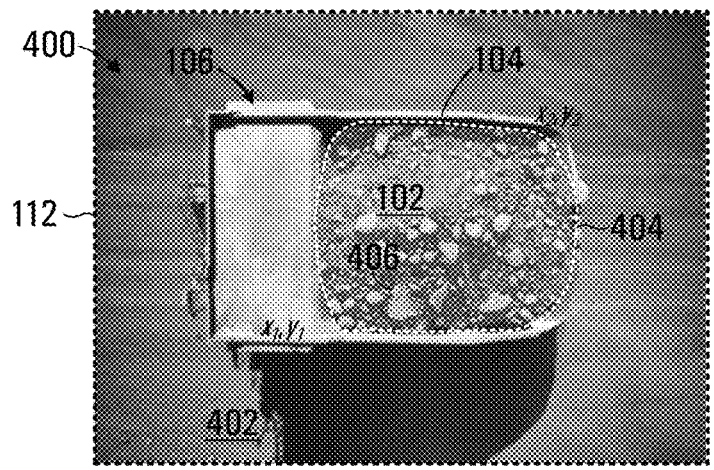
FIG. 4 is an example of an image captured by the camera shown in FIG. 1B.

The process 330 then continues at block 338, which directs the microprocessor 232 to generate a payload analysis for the payload region of interest 404. The payload analysis may involve any one of several different analysis processes. The payload analysis may, for example, involve determining whether there are any distinguishable payload portions such as large boulders or foreign objects within the payload 102. In FIG. 4, a boulder 406 may be detected and found to exceed a threshold ore size. The threshold size may be established based on a maximum dimension of boulder that can be safely processed by downstream processing equipment that receives payload from the vehicle 106. Distinguishable portions other than boulders may similarly be identified. Foreign objects such as metal parts may detach from excavator equipment and the microprocessor 232 of the remote processor circuit 230 may be operably configured to cause an alert signal to be produced in such cases. Block 338 then directs the microprocessor 232 back to block 332 and the process is repeated for the next queued image. In one embodiment, foreign objects may be detected by processing image data captured by the camera 110. A machine learning approach may be employed to detect common foreign objects, which may include metal tools and/or tooth parts of a shovel loader used to load the payload 104 into the vehicle 106. In some embodiments the imaging may be performed at infra-red wavelengths, since higher levels of infra-red radiation within the payload 104 may be indicative of a metallic or other foreign object within the payload that differs in temperature from the surrounding payload.

In this embodiment the remote processor circuit 230 performs the further processing. The identification of the payload region of interest and/or the subsequent payload analysis may be processor intensive and may not be completed before additional image data is captured by the camera 110. In other embodiments, the embedded processor 204 within the apparatus 100 may be configured to have the necessary processing performance to perform the identification of the region of interest and the payload analysis in near real time. In these cases, the payload analysis may be stripped down to focus on a single function such as boulder detection, to reduce the processing demands on the embedded processor 204.

In some embodiments the junction box 118 may provide continuous power to the illuminators 114 and 116 during low-light conditions to ensure that the vehicle 106 is detected and that adequate lighting is available for imaging purposes. In other embodiments the illuminators 114 and 116 may only be powered via the junction box 118 when the vehicle is present. As an example, the RFID reader 122 may be located in spaced apart relation to the truss 108 so that when the vehicle is detected prior to passing under the camera 110 a signal is transmitted over the data cable 218 to the I/O 208. The embedded processor 204 may be further configured to cause the illuminators 114 and 116 to be powered on prior to the vehicle passing under the camera 110. In order to avoid a driver of the vehicle 106 being startled by the illuminators 114 and 116 suddenly being powered on, the illumination level may be gradually increased after the vehicle is detected and then dimmed once the necessary images have been captured.

Figure 5:
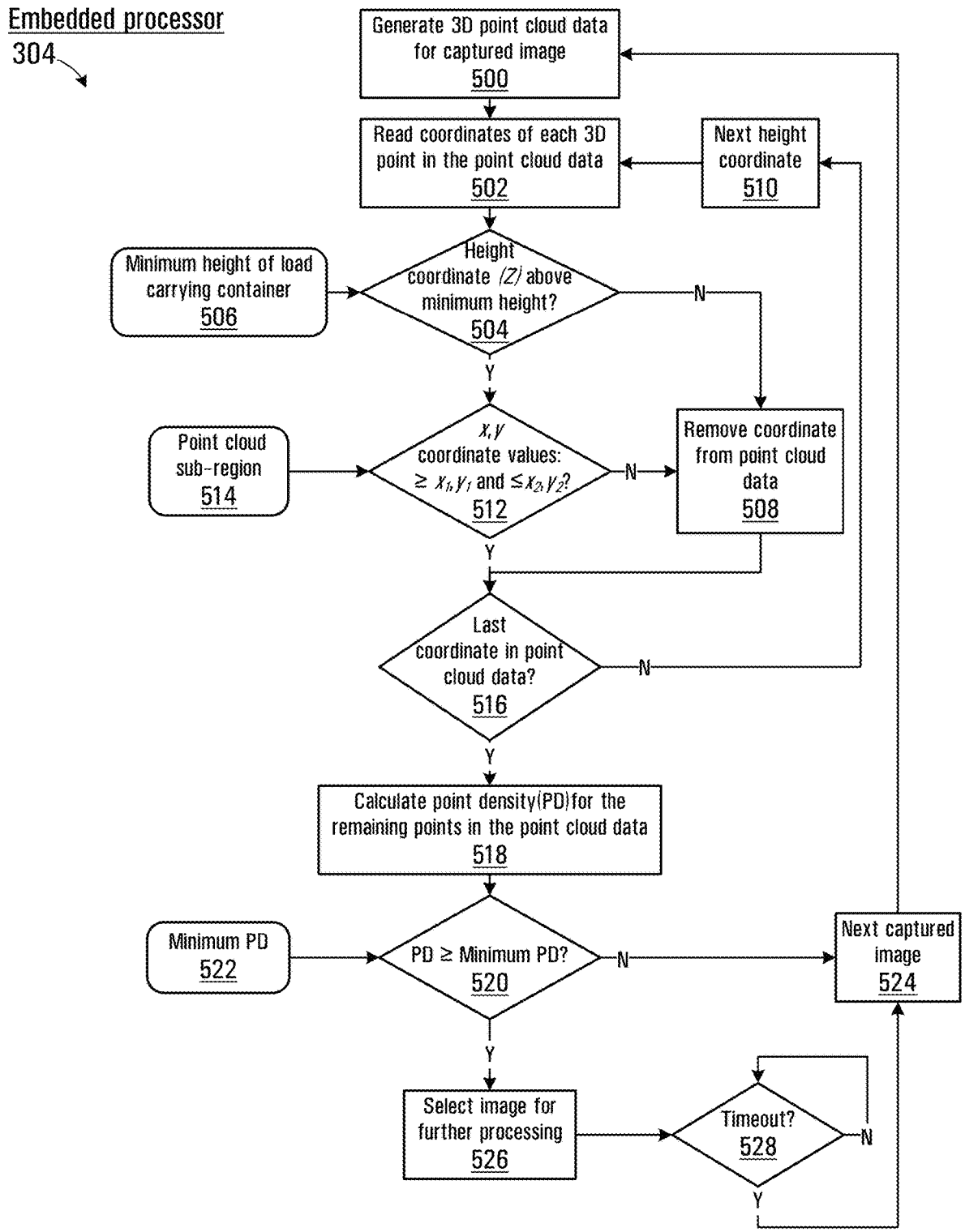
FIG. 5 is a flowchart depicting blocks of code for directing the embedded processor to determine whether a suitability criterion is met.

An example of a process for implementing block 304 of the process 300 is shown in FIG. 5. For the camera 110 having two spaced apart image sensors 130 and 132, the embedded processor 204 may be configured to process the resulting first and second 2D images from different perspective viewpoints to generate a 3D point cloud including 3D coordinates of the vehicle and the load carrying container. The embedded processor 204 may implement a stereoscopic process in which the first and second images are compared to find features that match and a shift or disparity between matching features used to determine 3D coordinates for the matched features. The set of 3D coordinates may be referred to as a 3D point cloud.

The generation of 3D point cloud information provides for convenient scaling of images to establish the physical dimensions associated with the payload 102. In other embodiments processing may be based on 2D image information along with additional scaling information. For example, if the dimensions of the load carrying container 104 of the vehicle 106 are known, then the 2D image may be scaled based on the edges of the load carrying container. In some embodiments, if one of the image sensors 130 and 132 are rendered inoperable due to dirt on lenses or another failure, the processing may proceed based on 2D information.

The process 304 begins at block 500, which directs the embedded processor 204 to generate 3D point cloud data from the first and second images captured by the image sensors 130 and 132. Block 502 then directs the embedded processor 204 to read the height coordinate for each 3D point in the point cloud data. Block 504 then directs the embedded processor 204 to read a first coordinate in the point cloud data and to determine whether the associated height coordinate is greater than a minimum expected height 506 of the load carrying container 104.

Figure 6:
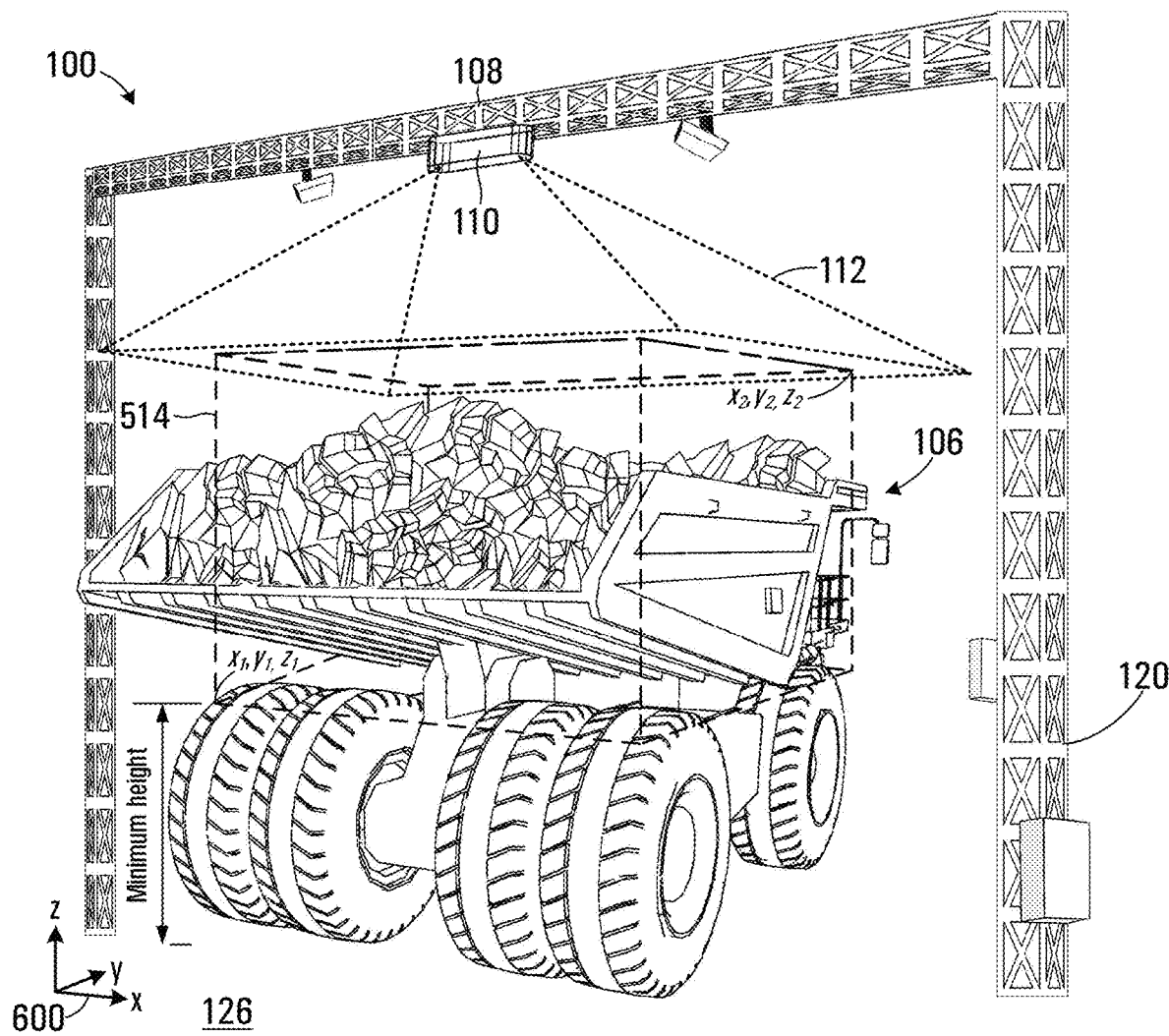
FIG. 6 is a further perspective view of the apparatus shown in FIG. 1A.

Referring to FIG. 6 for the worksite 126 the generated 3D point cloud would include 3D coordinates of the vehicle and the load carrying container within an x,y,z coordinate system 600. The 3D point cloud may also include 3D coordinates for other objects such as the ground surface and portions of the truss upright member 120, for example. The expected minimum height 506 may be set for the worksite 126 based on a known height of vehicles operating at that worksite (i.e. at a height $Z_1$ in FIG. 6). Use of the minimum expected height 506 may be particularly advantageous in cases where the vehicle 106 is a very large haul truck. While other vehicles such as a pick-up truck may traverse the field of view 112, captured images may be discarded by the embedded processor 204 of the camera 110 based on a lack of point cloud data above the minimum expected height 506. In this case the minimum expected height 506 for the mine worksite may be set higher than common non-haul truck vehicles commonly operated on a mine. If at block 504, the height coordinate is not above the minimum expected height 506, the embedded processor 204 is directed to block 508. Block 508 directs the embedded processor 204 to remove the 3D coordinate from the point cloud data. In this manner, any 3D coordinate values in the point cloud having a Z coordinate value less than $Z_1$ will be removed from consideration.

The process 304 then continues at block 512, which directs the microprocessor 204 to determine whether the x and y coordinate values fall within a point cloud sub region 514. Referring again to FIG. 6 the point cloud sub region 514 is shown in outline and in this embodiment extends only over a central portion of the field of view 112. The point cloud sub region 514 is thus defined as a cubic volume within the x,y,z coordinate system 600 extending between coordinates $x_1,y_1,z_1$ and $x_2,y_2,z_2$. The size of the cubic volume may be established as a proportion such as ⅓ or ¼ of the field of view 112. If the x and y coordinates of the point are not within the point cloud sub region 514 at block 512, the embedded processor 204 is directed to block 508, where the point is removed from the point cloud data. Block 508 then directs embedded processor 204 to block 516. If at block 512 the x and y coordinates of the point are within the point cloud sub region 514, the point is retained within the point cloud data and the embedded processor 204 is directed to block 516.

Block 516 directs the embedded processor 204 to determine whether the last coordinate in the point cloud data has been processed. If not, block 516 directs the embedded processor 204 to block 510, which directs the embedded processor to read the next height coordinate and to repeat blocks 502-516. If at block 516 the last coordinate in the point cloud data has been processed, the embedded processor 204 is directed to block 518. Blocks 504 and 512 thus pre-process the point cloud data and have the effect of reducing the number of points to those points that fall within the point cloud sub region 514, which is also generally centered with respect to the truss 108 and camera 110. This pre-processing substantially reduces the number of coordinate points in the point cloud data.

Block 518 then directs the embedded processor 204 to calculate a point density (PD) for the remaining points in the point cloud data. Point density may be defined as the number of coordinate points per unit volume. Various approximations may be used to estimate the PD for a point cloud and functions for efficient estimation of PD are generally available and may be readily implemented on the embedded processor 204. Block 520 then directs the embedded processor 204 to determine whether the calculated PD is greater than a threshold PD 522. As an example, the threshold PD 522 may be pre-determined based on the type of payload analysis that is being implemented. The threshold PD 522 may be set lower if it is only required to perform boulder detection, while a complete fragmentation analysis may require a higher threshold PD.

If the calculated PD does not exceed the threshold PD 522 at block 520, the embedded processor 204 is directed to block 524, where the next captured image is selected, and the embedded processor is directed to repeat blocks 500-518. If at block 520, the calculated PD exceeds the threshold PD 522, the embedded processor 204 is directed to block 526. Block 526 directs the embedded processor 204 to select the image for further transmission to the remote processor circuit 230 at block 306 of the process 300 shown in FIG. 3. The process 304 then continues at block 528 which directs the embedded processor 204 to discontinue processing further images until a timeout period expires. In one embodiment the timeout may be selected to permit the vehicle 106 sufficient time to exit the field of view 112 and may this be based on an expected traveling speed of the vehicle. Block 528 has the effect preventing processing of further images of the same vehicle 106 once an image meeting the suitability criterion has been selected and transmitted to the remote processor circuit 230. When there is no vehicle within the field of view 112 of the camera 110, the pre-processing at blocks 502-504 based on minimum expected height 506 will result in a very low calculated PD for the point cloud data due to exclusion of coordinates at the level of the ground surfaces 402. While in this embodiment only one image having a sufficient point density may be selected for further processing, in other embodiments more than one image may be transmitted for the purposes of further processing.

In the embodiment described above the camera 110 is configured to produce first and second images two physically spaced apart image sensors 130 and 132, in other embodiments the camera may have a single image sensor. In such embodiments, the single image sensor may be configured to capture a first and second images spaced apart in time. Movement of the vehicle 106 while traversing the field of view 112 would thus provide images from two different perspective viewpoints, which may be used to generate the 3D point cloud.

Stereoscopic processes for generating 3D data are dependent on texture, which facilitates identification of points for determining disparity between images. The density of the 3D point cloud is thus conveniently representative of the texture of the captured image. There would thus be a significant difference in point cloud density when no vehicle is present within the field of view 112, facilitating evaluation of the suitability criterion based on point cloud density. Alternative methods of 3D point cloud generation may be less dependent on texture and thus less sensitive to whether or not a vehicle is present in the field of view 112. In this case, prior knowledge about the geometry of the expected vehicles may be used to determine whether the captured image meets the suitability criterion. For example, a 2D horizontal plane taken through a 3D point cloud at sufficient height above the ground should yield features that show a typical aspect ratio of a haul truck. Images could thus be fairly rapidly processed to detect whether the typical vehicle geometry is present within the field of view 112 and to distinguish whether the vehicle is of interest or is another type of vehicle, such as a pick-up truck.

The embodiment of the image capture process 300 has been described above as resulting in the selection of a single image meeting the suitability criterion. In other embodiments the embedded processor 204 of the camera 110 may be operably configured to select a several images from successively captured images that meet the suitability criterion, each selected image providing a different view of the payload 102. Block 306 of the process 300 may thus transmit image data for several selected images of the vehicle 106 to the remote processor circuit 230 for further processing. If multiple generally suitable images are available, additional processing may be implemented to refine the images for removal of shadowing or other image quality defects. The further processing may make use of the plurality of selected images to generate a payload region of interest and/or payload analysis that aggregates or otherwise combines data from more than one image to generate results with improved accuracy or confidence level.

While embodiments are described above as using stereoscopic image processing techniques to generate 3D point cloud data from 2D images, in other embodiments the 3D point cloud data may be generated using other technologies such as LIDAR (Light Detection and Ranging), a time-of-flight camera, a scanning laser, etc. For example, a LIDAR sensor could be implemented to capture 3D point cloud data within the field of view 112. The LIDAR sensor may be combined with a 2D camera that provides 2D image data for identification of the region of interest.

Figure 7:
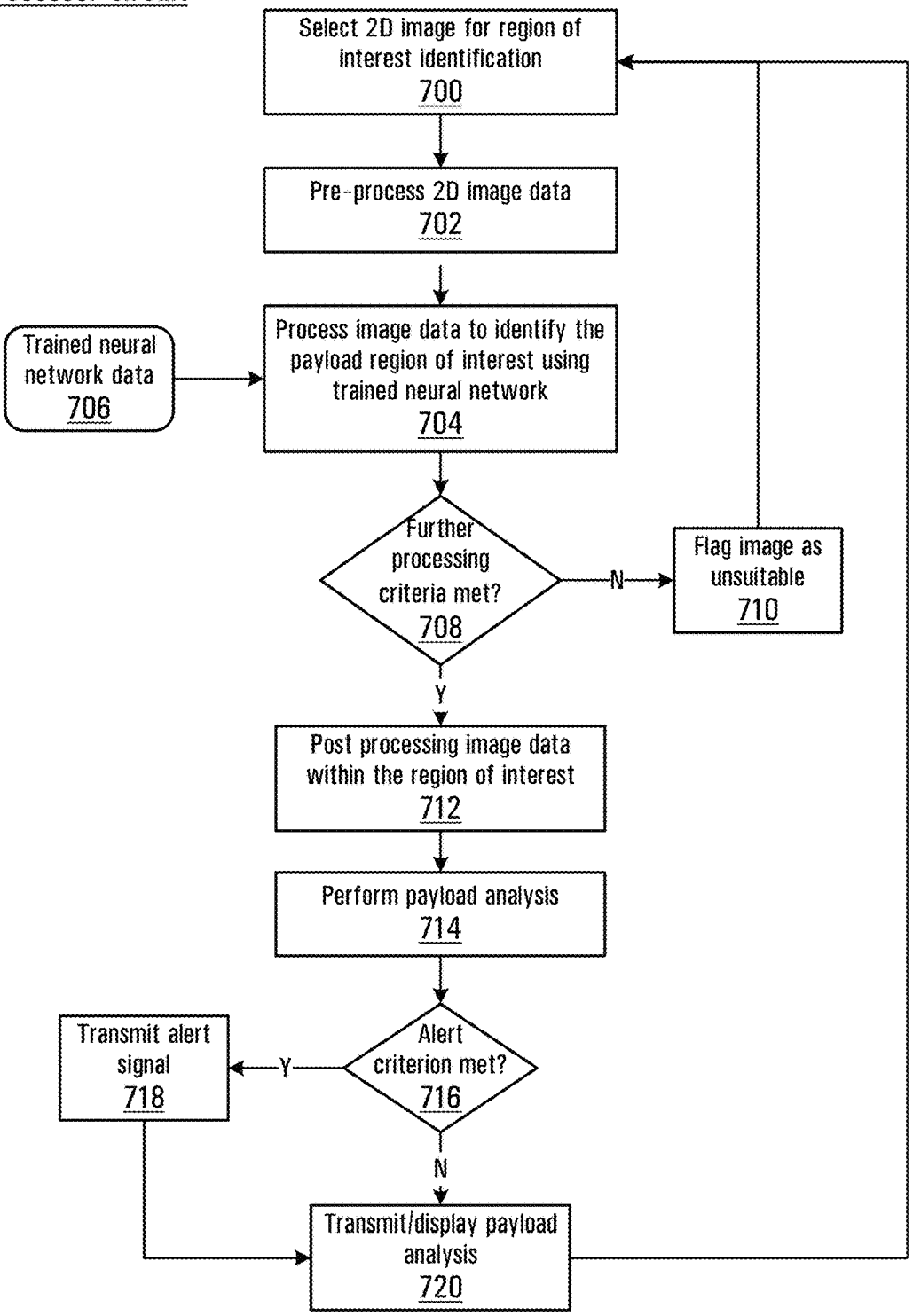
FIG. 7 is a flowchart depicting blocks of code for directing a remote processor circuit of the system shown in FIG. 2 to identify a payload region of interest.

An example of a process for implementing block 334 of the process 330 to identify a region of interest is shown in FIG. 7. As described above, the image sensors 130 and 132 of the camera 110 capture first and second 2D images and the embedded processor 204 further generates 3D point cloud data based on the first and second images. At block 306 of the image capture process 300 when the image is transmitted for further processing, at least one of the first and second 2D images may be transmitted to the remote processor circuit 230 where the data is written to the mass storage unit 240. In some embodiments the point cloud data may be discarded by the embedded processor 204 once the process 304 in FIG. 5 has completed and the first and second 2D images have been transmitted to the remote processor circuit 230. For high density (HD) image sensors 130 and 132, the 2D images may be transmitted in full HD resolution including color information. Typically, both of the first and second 2D images are transmitted and written to the mass storage unit 240. While the further processing performed by the remote processor circuit 230 may require 3D information, the processing cost associated with generating 3D point cloud data from the high density first and second 2D images is not expected to incur significant overhead when compared with the further processing. Accordingly, the 3D point cloud may be regenerated by the remote processor circuit 230 based on the first and second 2D images. In other embodiments the point cloud data generated by the embedded processor 204 may be retained and transmitted to the remote processor circuit 230. In embodiment where further processing is performed by the embedded processor 204, the point cloud data may be retained for further processing by the embedded processor.

The process 334 begins at block 700, which directs the microprocessor 232 of the remote processor circuit 230 to select one of the 2D images for processing to identify the payload region of interest. Block 702 then directs the microprocessor 232 to pre-process the 2D image data. The pre-processing at block 702 may involve one or more optionally implemented image processing functions. For example, the 2D image data may be rectified to compensate for image distortions caused by imaging optics associated with the image sensors 130 and 132. When imaging over a large field of view 112, geometric distortions due to imperfections and misalignments in the imaging optics are introduced in the image data and may be compensated by applying corrections to the image data. Various models for correcting common distortions are available and may be implemented rectify image data based on parameters of the imaging optics or other calibration data determined at the time of manufacturing.

In some embodiments, the 2D image data may be downsampled to generate a smaller image data file for payload region of interest identification. Reducing the image data resolution may facilitate more rapid processing than for a full HD image data file. In one embodiment the HD image may be reduced to a quarter of its original size for the purpose of region of interest identification.

Block 704 then directs the microprocessor 232 to process the 2D image to identify the payload region of interest using a trained neural network. In some embodiments the neural network may be trained using a set of labeled training images. The set of images may include images in which representative vehicles, representative load carrying containers, and representative payloads 102, may be identified by labeled boundaries within the respective images. In some of the training images the load carrying container may not be carrying a payload and the payload would thus not be identified by a labeled boundary. If the worksite 126 runs several different types of vehicles having load carrying containers, suitable labeled images may be included such that the neural network is trained to be able to generalize to be able to identify different vehicles.

The training of the neural network may be in a supervised learning process performed prior to deployment of the system 200 at a worksite 126. As such, the set of labeled training images may be previously labeled by a human operator and used in the training exercise. The human operator may also determine control parameters for the neural network training, which may be adjusted to optimize performance of the neural network. The trained neural network may be defined by a data set 706 that establishes the architecture of the neural network and defines the associated parameters and/or weights that configure the architecture to perform the payload region of interest identification function.

Figure 8:
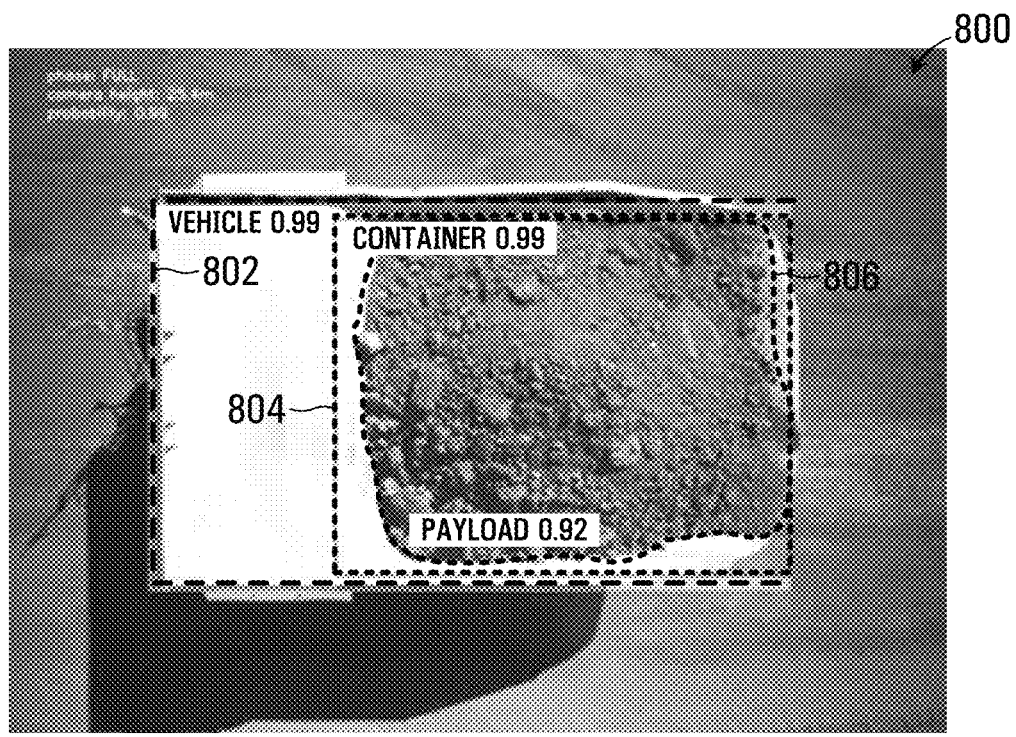
FIG. 8 is an example of an image on which a vehicle mask, a load carrying container mask, and payload mask are depicted.

Block 704 thus directs the microprocessor 232 to receive the pre-processed 2D image data and to generate a region of interest identification output based on the neural network data set 706. In one embodiment the output may be in the form of a set of masks or bounding regions as depicted in FIG. 8. Referring to FIG. 8, an image 800 having a vehicle 106 within the field of view 112 has a vehicle bounding box 802, a load carrying container bounding box 804, and a payload mask 806, each being indicated on the image in broken lines. The vehicle bounding box 802 identifies the image 800 as including a vehicle with a confidence level of 0.99 (i.e. 99%). The load carrying container bounding box 804 identifies boundaries associated with the load carrying container, again with a confidence level of 0.99. Finally, the payload mask 806 identifies the payload region of interest with a confidence level of 0.92. The bounding boxes 802 and 804 produced by the neural network may each be defined by boundary pixels demarcating these regions within the downsampled image.

The process 324 then continues at block 708, which directs the microprocessor 232 to determine whether further processing criteria are met by the identified masks. As an example, threshold confidence levels may be established for each of the bounding boxes 802 and 804. If the confidence level associated with the vehicle bounding box 802 is lower than the threshold (for example 0.85), the image may not be a load carrying vehicle or may not include a vehicle at all and the selection and transmission by the camera 110 may have been in error. Similarly, if the vehicle bounding box 802 has a high associated level of confidence, but the container bounding box 804 does not meet the threshold confidence level, there may be problems with the image that would prevent successful further processing. The further processing criteria may also involve logical determinations that are used to prevent processing of unsuitable captured images. For example, if the load carrying container bounding box 804 is located outside, or partway outside the vehicle bounding box 802, this may be indicative of an unsuitable image that if further processed may yield erroneous results. Similarly, if the payload mask 806 is located outside, or partway outside the load carrying container bounding box 804 the this may also be indicative of an unsuitable image.

If at block 708 the established confidence level thresholds are not met, the microprocessor 232 is directed to block 710 where the selected image is flagged as being unsuitable for further processing. Block 710 may direct the microprocessor 232 to flag the associated 2D and 3D point cloud data in the mass storage unit 240 such or the data may be deleted.

If at block 708 the established confidence level thresholds are met, the microprocessor 232 is directed to block 712. Block 712 directs the microprocessor 232 to perform post-processing of the image data within the region of interest. The post-processing may involve processing image data to intensify shadowed regions that occur due to the sides of the load carrying container 104 shadowing some of the payload 102. For example, a color intensity manipulation may be implemented by a neutral network to provide a more consistent input for payload analysis. In embodiments where the payload mask 806 is established based on image data that has been down-sampled at block 702, the post-processing may be performed on the original selected HD image data stored in the mass storage unit 240. The post-processing would thus involve first mapping boundary pixels of the payload mask 806 determined for the down-sampled image to the original HD image pixels prior to performing image processing.

Block 714 then directs the microprocessor 232 to perform the payload analysis on the post-processed image data. In one embodiment the microprocessor 232 may be operably configured to generate the payload analysis by performing a segmentation analysis on the payload region of interest 806 to determine sizes of distinguishable portions of the payload. For example, the payload analysis may involve performing a fragmentation analysis on the payload as described in commonly owned patent application Ser. No. 15/752,430 by Tafazoli Bilandi et al., entitled "METHOD AND APPARATUS FOR IDENTIFYING FRAGMENTED MATERIAL PORTIONS WITHIN AN IMAGE", which is incorporated herein by reference in its entirety.

Figure 9:
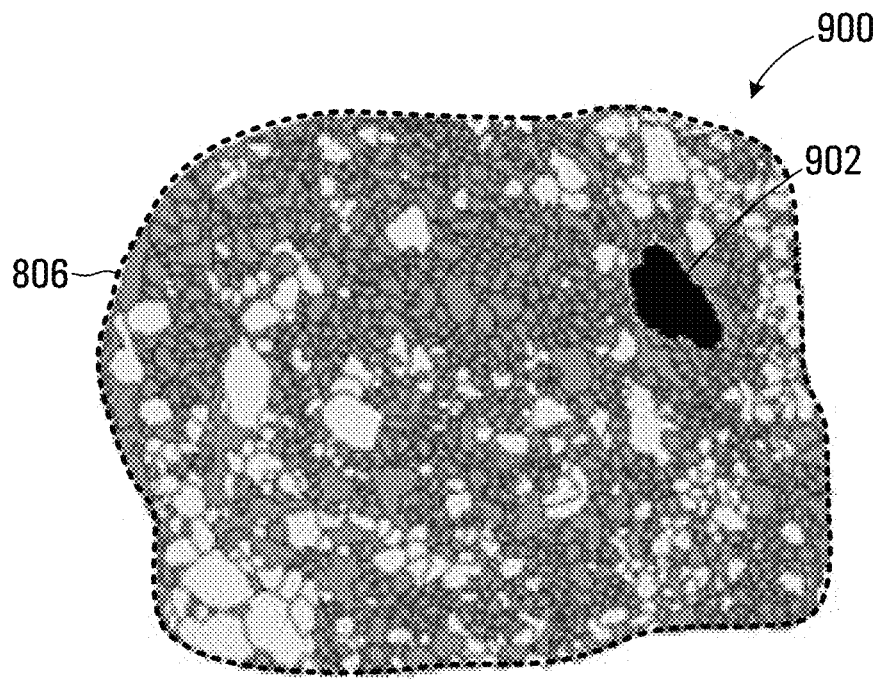
FIG. 9 is an example of a fragmentation analysis result for the payload shown in FIG. 8.

Referring to FIG. 9, an example of a fragmentation analysis result within the identified payload mask 806 for the payload shown in FIG. 8 is shown at 900. Generally fragmentation analysis performed in accordance with the methods disclosed in the 15/752430 application involves processing of pixel data using a convolutional neural network that indicates whether pixels are located at an edge of a fragmented material portion, inwardly from the edge of a fragmented material portion, or at interstices between fragmented material portions. In some disclosed embodiments the determination is made on based at least in part on 2D and 3D disparity information. The resulting pixel classification may then be further processed to associate identified edges with fragmented material portions and to provide size scaling for the fragment sizes.

Referring back to FIG. 7, having generated the payload analysis at block 714, the process 324 continues at block 716, which directs the microprocessor 232 to determine whether an alert criterion has been met. For the example shown in FIG. 9, an identified fragment 902 may have been identified as a boulder that exceeds a threshold ore size for processing in other equipment at the worksite. If at block 716 the alert criterion is met, the microprocessor 232 is directed to block 718. Block 718 directs the microprocessor 232 to transmit an alert message to the processor circuit 250 via the network 220, shown in FIG. 2. The alert message, when received at the communications interface 258 of the processor circuit 250, causes the microprocessor 252 to cause an alert signal to be produced at the operations center of the worksite 126. The processor circuit 250 is operable to cause an alert annunciator to generate either an audible warning on a loudspeaker annunciator 264 or a visual annunciation on the display 262 for alerting an operator to the presence of the boulder in the payload of the vehicle.

If at block 716 the alert criterion is not met, the microprocessor 232 is directed to block 720. Block 720 directs the microprocessor 232 to optionally perform appropriate steps for displaying or transmitting the payload analysis. As an example, fragmentation payload analysis records may be stored for later access by a mining engineer at the worksite 126 for use in making mining decisions. The results may, for example, indicate that the ore being currently excavated is not optimal and the mining engineer may re-deploy excavation resources at a different mine face.

Figure 10:
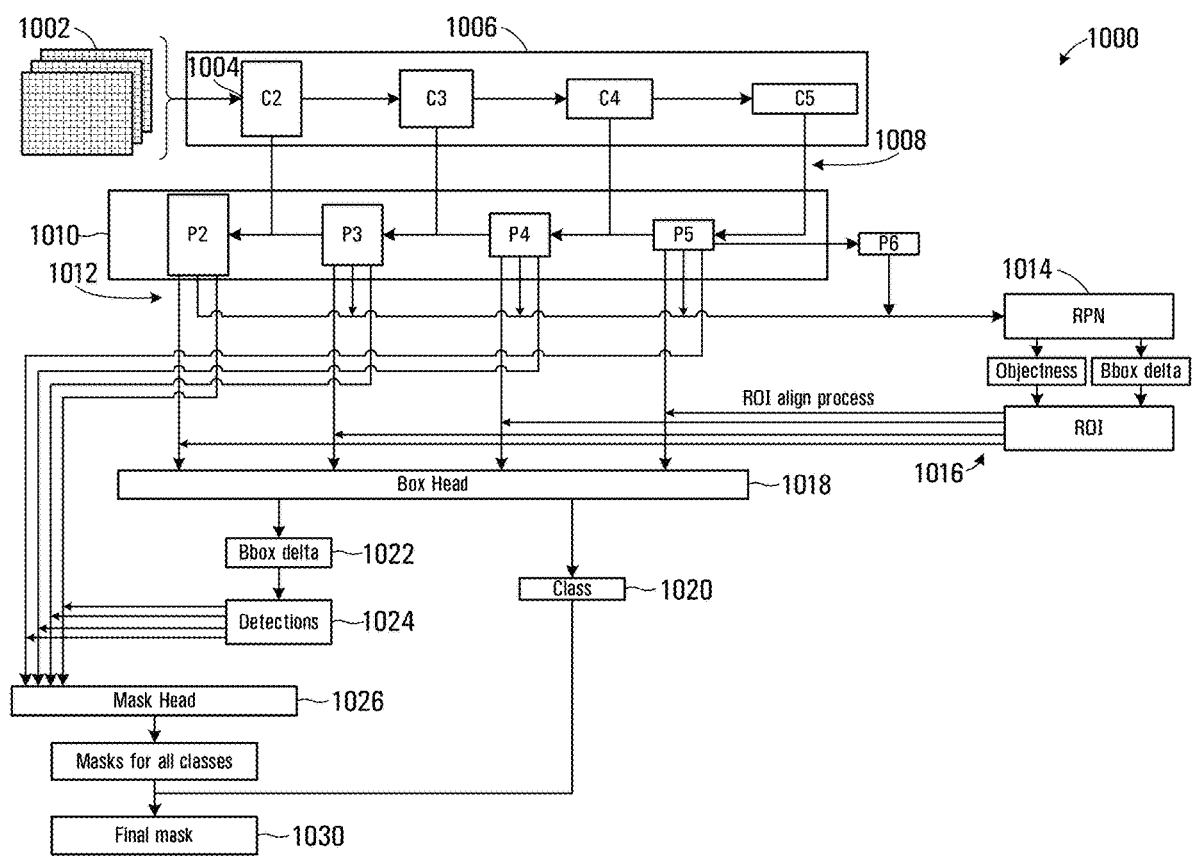
FIG. 10 is a block diagram of a neural network architecture for identifying the payload region of interest.

Referring to FIG. 10, a neural network architecture for identifying the payload region of interest in shown as a block diagram at 1000. The blocks represent functions implemented via blocks of codes that direct the microprocessor 232 to perform processing tasks for identifying the payload region of interest. The neural network implementation is based on an architecture proposed in "Mask R-CNN", Kaiming H. et al. 2017, which is incorporated herein by reference in its entirety. The mask R-CNN may be implemented to efficiently detect objects in an image while simultaneously generating a segmentation mask for each object instance. The end-to-end architecture is a multi-stage neural network with multiple heads that provides predictions for multiple instances of object types, their bounding boxes, and the corresponding masks or boundaries.

The neural network 1000 includes a four-level feature pyramid network (FPN) such as described in "Feature Pyramid Networks for Object Detection", Tsung-Yi Lin et al, 2017, which is incorporated herein by reference in its entirety. The FPN is shown generally as blocks 1006 and 1010 and the pre-processed image data 1002 is fed into an input 1004 to a residual neural network (ResNet) 1006 of the FPN. The ResNet 1006 generates features using a backbone network such as ResNet 101 described in "Deep Residual Learning for Image Recognition", Kaiming He et al., 2015. Backbone networks are previously trained on publicly available natural image datasets such as ImageNet can classify images into object categories.

The outputs 1008 of the ResNet 1006 are fed to block 1010 of the FPN which generates a plurality of outputs 1012, ranging from low-level highly detailed features up to high-level semantic representations of the input image 1002. The FPN block 1010 combines bottom-to-up and up-to-bottom feature maps received from the ResNet 1006 and generates rich feature maps at the outputs 1012. The outputs 1012 can be further used in the neural network 1000 to localize and segment objects of interest.

For each of the top to bottom pathways of the FPN 1010, a light-weight region proposal network (RPN) 1014 finds regions within the feature maps generated by the FPN 1010 where one object of interest potentially exists. The RPN 1014 ranks a set of anchors per position within each level of the feature map pyramid. In each level, a fixed stride is used to select some positions, and for each position a set of anchors are defined. Each anchor set includes horizontal and vertical boxes at different scales (typically three scales, each with three anchors). To map these regions to the corresponding location within the original image, the set of anchors are predefined. Predicted regions are assigned to the reference anchors based-on overlap between pair of anchors and regions. Proposals are filtered by their rank, maximum expected regions, and the overlap with the reference using a non-maximum suppression (NMS) approach. Remaining regions need to be mapped into a fixed size so that multiple heads of the network could be attached to the feature set. A region of interest align (ROI align) process 1016, is used to collect all regions based on their score. The ROI align approach will generate an output of fixed size where each pixel is generated from sampling within an area of feature map that corresponds to that output pixel. All sampled points are averaged, and the average value will be assigned to the output pixel.

Depending on the size of the proposals, one of the feature maps generated at the outputs 1012 by the FPN 1010 represents a range of size objects that will be used for ROI alignment. Outputs 1016 are fed into a fully connected layer or box head 1018 to generate a feature vector of certain size for each of the regions. This list of vectors is used in two branches to generate class probability 1020 and bounding box coordinates 1022 for each region. The outputs of the ROI align process 1016 and the generated results 1020, 1022 are further processed, per class, to generate final detections 1024 for each class. This process filters out proposals based on probability scores and calculates non-maximum suppression (NMS) per class, where NMS is used to make sure that a particular object is identified only once.

The feature map outputs at the outputs 1012 of the FPN 1010 are mapped into a fixed size array according to the final detection results. An approach as similar to the ROI align process is used and the results are fed into a series of neural network convolution layers to adjust number of output channels. Then a series of deconvolution layers recover spatial information and 1-D convolutions reduce number of channels to match the total number of classes (i.e. in this case the payload 102 which is identified by the payload mask 806). Generated masks for each class are then resized back to match the original image size at 1030. Each mask is generated by cutting prediction maps at 0.5.

Figure 11:
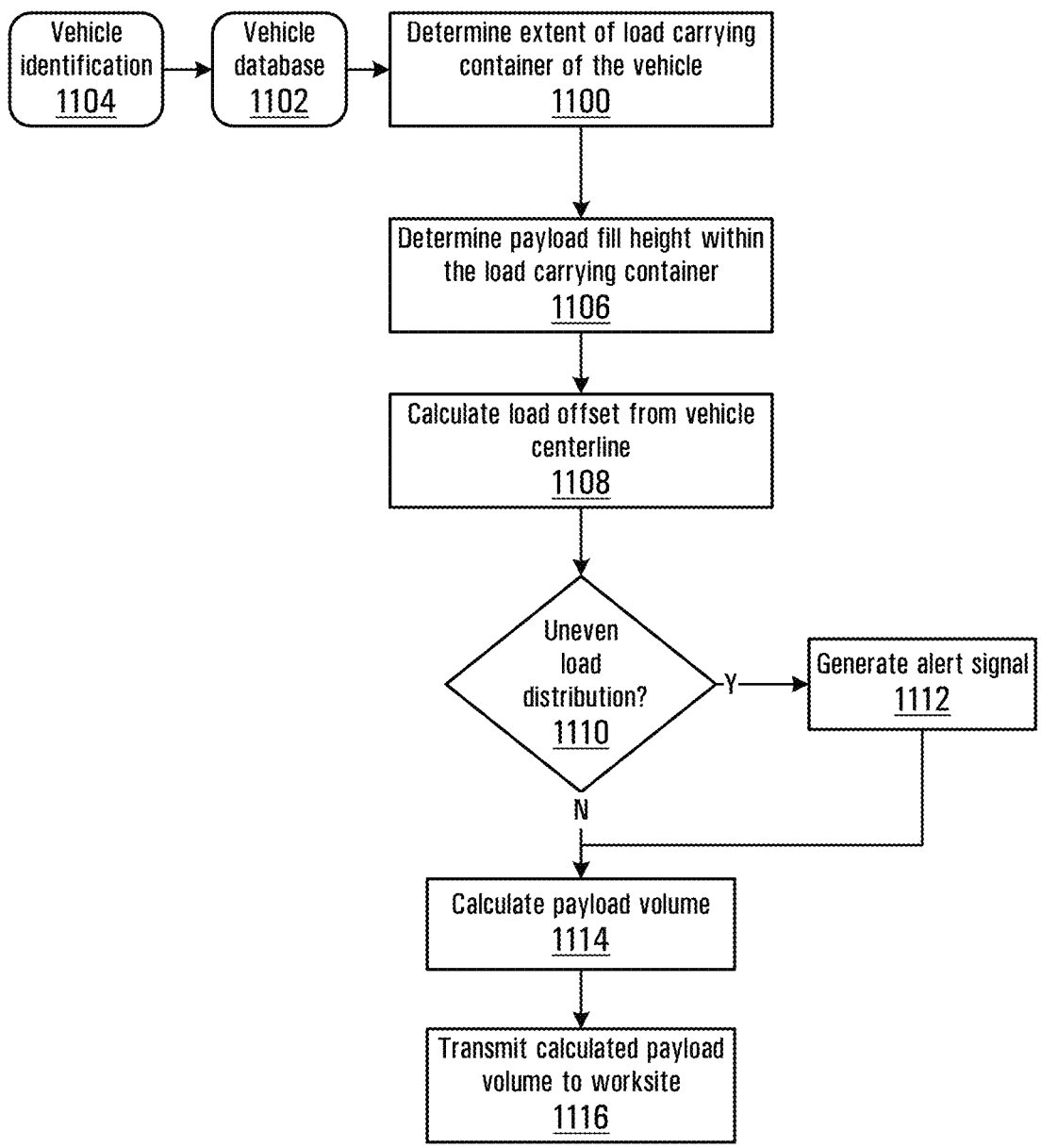
FIG. 11 is a flowchart depicting blocks of code for directing a remote processor circuit to perform an alternative payload analysis.

Another embodiment for implementing the payload analysis block 714 in FIG. 7 is described in more detail with reference to FIG. 11. The process shown in FIG. 11 may be performed as an alternative to or in addition to the fragmentation process described above. Block 1100 directs the microprocessor 232 to determine an extent of the load carrying container 104 of the vehicle 106. In one embodiment the extents of the load carrying container 104 may be determined by performing the further processing steps described above while the vehicle 106 is known to have an empty load carrying container 104. In this case, actual extents for the load carrying container may be determined from 3D coordinates associated with points within the vehicle mask 802 and the payload mask 806 selected to provide interior extents of the container. The determined container extents for the vehicle 106 would thus be pre-determined at some time and stored in a vehicle database 1102. The vehicle database 1102 may be stored on the mass storage unit 240 or other location in communication with the remote processor circuit 230. In this embodiment, block 1100 thus directs the microprocessor 232 to determine a vehicle identification 1104 associated with the selected image being processed. As noted above, the RFID reader 122 of the apparatus 100 shown in FIG. 1 may be used to read a vehicle identification that is associated with the selected images that are transmitted by the camera 110 to the remote processor circuit 230. The vehicle identification 1104 is then used to locate the container extent data in the vehicle database 1102.

In other embodiments, extents for vehicles used in the worksite 126 may be pre-determined from specifications for the vehicle or conventionally measured and stored in the vehicle database 1102 referenced to vehicle identifications. As described above, block 1100 directs the microprocessor 232 to determine the vehicle identification 1104 and the corresponding container extents may be located in the database 1102. In some embodiments, when there is a failure to identify the vehicle, the microprocessor 232 may be operably configured to discard the images of the vehicle or to mark results as being associated with an un-identified vehicle.

Following a determination of the extents of the load carrying container 104 of the vehicle 106 associated with the selected image currently being processed, the microprocessor 232 is directed to block 1106. Block 1106 directs the microprocessor 232 to determine a payload fill height within the load carrying container 104 based on 3D coordinates for points within the payload region of interest (i.e. the payload mask 806). Block 1106 directs the microprocessor 232 to select a plurality of points in the 2D image that lie within the payload mask 806 and to determine 3D coordinates for these points that provide corresponding payload fill height points. This may involve selecting coordinates from 3D point cloud data that match the selected plurality of points. In effect block 1106 determines a load height distribution within the load carrying container 104.

Block 1108 then directs the microprocessor 323 to use the load height distribution over the extents of the load carrying container 104 to calculate a load offset from a centerline passing longitudinally through the load carrying container. A laterally offset load may potentially result in instability of the vehicle 106. Longitudinal load offsets are less problematic due to the length of the vehicle wheelbase in this direction. In one embodiment the load offset may be expressed as a percentage of a lateral extent of load carrying container 104. The load offset may be of interest to an operator at the worksite 126 in detecting vehicles that have an uneven load distribution. In some embodiments the load offset may be associated with a shovel or other heavy equipment that loaded the vehicle 106, so that uneven loading by specific operators may be detected and corrected. In the process embodiment shown, block 1110 then directs the microprocessor 232 to determine whether the load distribution is uneven (i.e. the load offset is greater than a maximum pre-determined percentage). When the maximum load offset is exceeded, block 1110 directs the microprocessor 232 to block 1112, where an alert signal is generated and processed generally as described above. If at block 1110, the maximum load offset is not exceeded, the microprocessor 232 is directed to block 1114.

Block 1114 directs the microprocessor 232 to calculate the bulk volume of the payload. The payload bulk volume is laterally bounded by the payload mask 806 at the payload surface and by the extents of the container below the payload surface. These bounds and the payload fill height points may thus be used to generate a relatively accurate estimate of the bulk volume of payload being carried in the load carrying container 104. Block 1116 then directs the microprocessor 232 to transmit the calculated payload volume to the worksite 126 or other location where information related to operations at the worksite is displayed.

Figure 12:
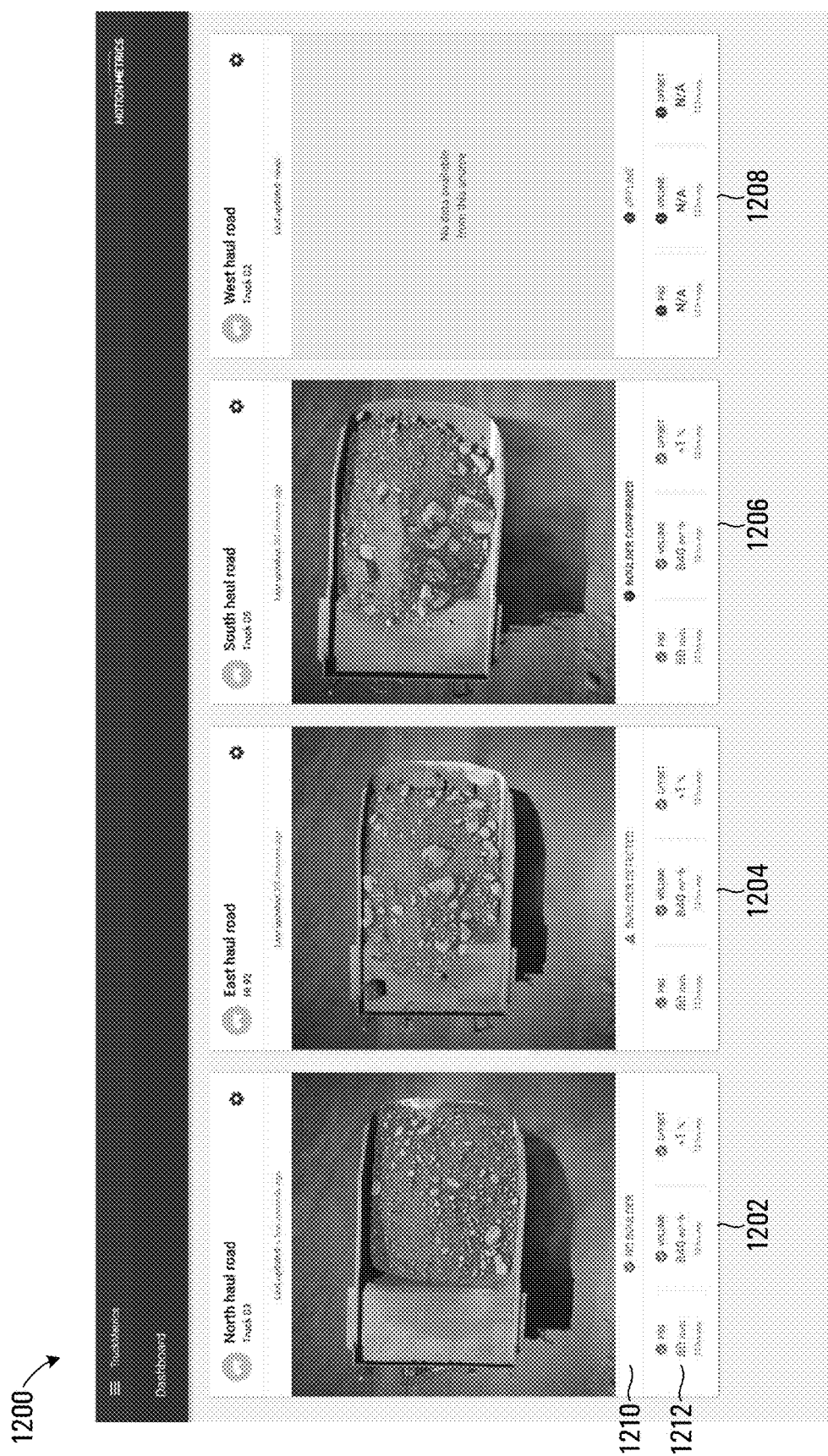
FIG. 12 is a screenshot of a result dashboard in accordance with one disclosed embodiment.

The operations center processor circuit 250 shown in FIG. 2 may receive data via the network 220 from several cameras 110. For example, in one embodiment a worksite may include several roads exiting the site and each may include an associated apparatus 100 and camera 110. Referring to FIG. 12, in one embodiment a dashboard 1200 may be displayed by the operations center processor circuit 250 on the display 262. The dashboard 1200 displays status information for four different locations 1202, 1204, 1206, and 1208. At the location 1208 no truck is currently detected or present. Each of the locations has status information associated with a detected haul truck and the respective payload. Each status display includes a prominent alert region 1210, which indicates whether a boulder or any other foreign object is detected in the payload. Other regions 1212 of the dashboard 1200 display further status information, such as an average fragmentation number for the last 12 hours, an average bulk volume calculated from payload volumes determined at block 1110 of the process 714, and the load offset calculated at block 1106 of the process 714.

While specific embodiments have been described and illustrated, such embodiments should be considered illustrative only and not as limiting the disclosed embodiments as construed in accordance with the accompanying claims.

What is claimed is:

1. An apparatus for analyzing a payload being transported in a load carrying container of a vehicle, the apparatus comprising:
   a camera disposed to successively capture images of vehicles traversing a field of view of the camera;
   at least one processor in communication with the camera, the at least one processor being operably configured to select at least one image from the successively captured images in response to:
      a likelihood of a vehicle and load carrying container being within the field of view in the at least one image; and
      image data associated with the least one image meeting a suitability criterion for further processing, wherein the suitability criterion includes determining whether the vehicle and load carrying container is located completely within the field of view;
   wherein the further processing comprises causing the at least one processor to:
      process the selected at least one image to identify a payload region of interest within the image; and
      generate a payload analysis within the identified payload region of interest based the image data associated with the least one image.

2. The apparatus of claim 1 wherein the at least one processor is operably configured to select the at least one image by:
   generating 3D point cloud data for successive captured images;
   determining a point density of the point cloud data; and
   comparing the point density to a threshold point density to determine whether a suitability criterion is met.

3. The apparatus of claim 2 wherein the at least one processor is operably configured to pre-process the 3D point cloud data for the selected image prior to generating the payload analysis, comprises at least one of:
   removing point cloud coordinates that are located below an expected height of load supporting base of the load carrying container with respect to a surrounding ground surface; and/or removing point cloud coordinates that are outside a point cloud sub region within the point cloud, the point cloud sub region being smaller than the point cloud.

4. The apparatus of claim 2 wherein when a plurality of images are determined to meet the suitability criterion the at least one processor is further operably configured to select for further processing, at least one of:
   an image having a highest point density;
   a first image having a point density that exceeds a threshold point density; or
   a plurality of images that have a point density that exceed the threshold point density.

5. The apparatus of claim 1 wherein the processor is further operably configured to generate a confidence level while processing the selected image to identify a payload region of interest, the confidence level quantifying a confidence that the identified region of interest includes a payload and wherein the confidence level is used at least in part to determine whether the suitability criterion is met for the selected image.

6. The apparatus of claim 1 wherein the at least one processor is operably configured to select a plurality of images from the successively captured images, each of the plurality of images providing a different view of the payload and wherein the at least one processor is operably configured to perform the further processing for each of the plurality of images to produce the payload analysis.

7. The apparatus of claim 1 wherein the camera is disposed above the vehicle and the field of view is oriented downward to capture images of an upper surface of the payload exposed by an open top of the load carrying container.

8. The apparatus of claim 1 wherein the at least one processor comprises an embedded processor in communication with the camera, the embedded processor being operable to cause image data for the selected image to be transmitted to a remote processor and wherein the further processing is performed by the remote processor.

9. The apparatus of claim 8 wherein the embedded processor includes a wide area network interface, the embedded processor being operable to upload the selected image to the remote processor via the wide area network.

10. The apparatus of claim 1 wherein the at least one processor, in response to the payload analysis meeting an alert criterion, is operably configured to cause an alert signal to be produced.

11. The apparatus of claim 10 wherein the apparatus further comprises an alert annunciator operably configured to generate one of an audible or a visual annunciation for alerting an operator.

12. The apparatus of claim 1 wherein the at least one processor is operably configured to process first and second 2D images from different perspective viewpoints to generate a 3D point cloud including 3D coordinates of the vehicle and the load carrying container.

13. The apparatus of claim 12 wherein the camera comprises one of:
   first and second image sensors that are offset to capture the respective first and second 2D images from different perspective viewpoints; and
   a single image sensor operably configured to capture a first and second images spaced apart in time such that movement of the vehicle while traversing the field of view provides the different perspective viewpoints for the first and second images.

14. The apparatus of claim 12 wherein the at least one processor is operable to process one of the respective 2D images to identify the payload region of interest in 2D, and to generate the payload analysis by processing 2D data within with the payload region of interest, and wherein the at least one processor is operably configured to use the 3D point cloud to generate scaling information for the payload analysis.

15. The apparatus of claim 1 wherein the at least one processor is operably configured to process the selected image to identify the payload region of interest using a trained neural network to produce an output localizing the region of interest within the selected image.

16. The apparatus of claim 15 further comprising training the neural network using at least one of:

a set of images of representative load carrying containers that have been previously labeled by a human; and an unsupervised learning algorithm implemented to extract patterns in the image data.

17. The apparatus of claim 15 wherein the neural network comprises a mask region based convolutional neural network.

18. The apparatus of claim 15 wherein the at least one processor is operably configured to process the selected image by at least one of:

processing the image data to intensify shadowed regions prior to performing the payload analysis;

performing a rectification of the selected image to correct image distortions caused by imaging optics associated with the camera prior to identifying the payload region of interest; and down-sampling the original selected image to produce a down-sampled image having a reduced number of pixels prior to identifying the payload region of interest.

19. The apparatus of claim 18 wherein the output of the neural network identifies boundary pixels demarcating the payload region of interest within the down-sampled image and wherein generating the payload analysis comprises determining corresponding boundary pixels within the original selected image and processing portions of original selected image within the corresponding boundary pixels.

20. The apparatus of claim 1 wherein the at least one processor is operably configured to determine an extent of the load carrying container of the vehicle by one of:

determining a vehicle identification associated with the selected image and reading parameters from a database defining an extent of the load carrying container for the identified vehicle; and performing the further processing for the vehicle with an empty load carrying container and determining an extent of the load carrying container based on the empty load carrying container.

21. The apparatus of claim 20 wherein the at least one processor is operably configured to perform the vehicle identification by one of:

processing at least one of the successive images to extract a vehicle identifier displayed on the vehicle within the field of view of the camera;

receiving an identifier from a radio-frequency identification (RFID) sensor disposed to read a RFID tag carried by the vehicle; or processing at least one of the successive captured images using a neural network that has been previously trained to generate a vehicle identification from the captured image.

22. The apparatus of claim 20 wherein the processor is operably configured to generate the payload analysis by determining a volume of the payload by determining a payload fill height within the load carrying container based on 3D coordinates for points within the payload region of interest and calculating the payload volume based on the payload fill height and the determined extents of the load carrying container.

23. The apparatus of claim 1 wherein the processor is operably configured to generate the payload analysis by identifying if a foreign object is within the payload.

24. The apparatus of claim 23 wherein the processor is operably configured to identify the foreign object by processing infra-red images of the payload, the foreign object being identified by detecting electromagnetic radiation at infra-red wavelengths.

25. The apparatus of claim 1 wherein the processor is operably configured to:

generate the payload analysis by calculating a load offset; and generate an uneven loading alert if the load offset exceeds a pre-determined maximum load offset.

26. The apparatus of claim 1 wherein the processor is operably configured to generate the payload analysis by performing a segmentation analysis on the payload region of interest to determine sizes of distinguishable portions of the payload.

27. The apparatus of claim 26 wherein in response to at least one distinguishable portion exceeding a threshold size or being identified as a non-payload object, the processor is operably configured to cause an alert signal to be produced.

28. The apparatus of claim 27 wherein the payload comprises an excavated ore payload and wherein the segmentation analysis comprises one of:

a fragmentation analysis that identifies distinguishable portions as being one of a rock portion, a fines portion, or an interstice between portions;

a load distribution within the extents of the load carrying container; and a moisture analysis that classifies a level of moisture associated with the payload.

29. The apparatus of claim 1 wherein the vehicle comprises one of a haul truck, a railcar, a barge, a trolley, a LHD vehicle, or a mining skip.

30. An apparatus for analyzing a payload being transported in a load carrying container of a vehicle, the apparatus comprising:

a camera disposed to successively capture images of vehicles traversing a field of view of the camera;

at least one processor in communication with the camera, the at least one processor being operably configured to select at least one image from the successively captured images in response to:

a likelihood of a vehicle and load carrying container being within the field of view in the at least one image; and image data associated with the least one image meeting a suitability criterion for further processing;

wherein the at least one processor is operably configured to select the at least one image by:

generating 3D point cloud data for successive captured images;

determining a point density of the point cloud data; and comparing the point density to a threshold point density to determine whether a suitability criterion is met; and wherein the further processing comprises causing the at least one processor to:

process the selected at least one image to identify a payload region of interest within the image; and generate a payload analysis within the identified payload region of interest based the image data associated with the least one image.

31. The apparatus of claim 30 wherein the at least one processor is operably configured to pre-process the 3D point cloud data for the selected image prior to generating the payload analysis, comprises at least one of:

removing point cloud coordinates that are located below an expected height of load supporting base of the load carrying container with respect to a surrounding ground surface; and/or removing point cloud coordinates that are outside a point cloud sub region within the point cloud, the point cloud sub region being smaller than the point cloud.

32. The apparatus of claim 30 wherein when a plurality of images are determined to meet the suitability criterion the at least one processor is further operably configured to select for further processing, at least one of:
  an image having a highest point density;
  a first image having a point density that exceeds a threshold point density; or
  a plurality of images that have a point density that exceed the threshold point density.

* * * * *